United States Patent
Jang et al.

(10) Patent No.: US 11,252,432 B2
(45) Date of Patent: Feb. 15, 2022

(54) IMAGE PROCESSING METHOD BASED ON INTER PREDICTION MODE, AND DEVICE THEREFOR

(71) Applicant: LG ELECTRONICS INC., Seoul (KR)

(72) Inventors: Hyeongmoon Jang, Seoul (KR); Junghak Nam, Seoul (KR); Naeri Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/060,582

(22) Filed: Oct. 1, 2020

(65) Prior Publication Data
US 2021/0021860 A1    Jan. 21, 2021

Related U.S. Application Data

(63) Continuation of application No. PCT/KR2019/003825, filed on Apr. 1, 2019.
(Continued)

(51) Int. Cl.
*H04N 11/02* (2006.01)
*H04N 19/513* (2014.01)
(Continued)

(52) U.S. Cl.
CPC ......... *H04N 19/513* (2014.11); *H04N 19/109* (2014.11); *H04N 19/136* (2014.11);
(Continued)

(58) Field of Classification Search
CPC .................................................. H04N 19/513
(Continued)

(56) References Cited

U.S. PATENT DOCUMENTS 10,368,083 B2 *  7/2019  Chien .................... H04N 19/70
2014/0240456 A1 *  8/2014  Kang .................... H04N 19/513
                                                               348/42
(Continued)

FOREIGN PATENT DOCUMENTS

JP      2018506908      3/2018
KR      20160006250     1/2016
(Continued)

OTHER PUBLICATIONS

Chen et al., "Algorithm Description of Joint Exploration Test Model 7 (JEM 7)," JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017, 48 pages.

(Continued)

*Primary Examiner* — Leron Beck
(74) *Attorney, Agent, or Firm* — Fish & Richardson P.C.

(57) ABSTRACT

In the present disclosure, a method of decoding a video signal and a device therefor are disclosed. Specifically, a method of decoding an image based on an inter prediction mode includes deriving a motion vector of an available spatial neighboring block around a current block; deriving a collocated block of the current block based on the motion vector of the spatial neighboring block; deriving a motion vector in a sub-block unit in the current block based on a motion vector of the collocated block; and generating a prediction block of the current block using the motion vector derived in the sub-block unit, wherein the collocated block may be specified by the motion vector of the spatial neighboring block in one pre-defined reference picture.

9 Claims, 21 Drawing Sheets

Related U.S. Application Data

(60) Provisional application No. 62/651,229, filed on Apr. 1, 2018.

(51) Int. Cl.
*H04N 19/109* (2014.01)
*H04N 19/136* (2014.01)
*H04N 19/176* (2014.01)
*H04N 19/587* (2014.01)
*H04N 19/70* (2014.01)

(52) U.S. Cl.
CPC ......... *H04N 19/176* (2014.11); *H04N 19/587* (2014.11); *H04N 19/70* (2014.11)

(58) Field of Classification Search
USPC ........................................ 375/240.01–240.29
See application file for complete search history.

(56) References Cited

U.S. PATENT DOCUMENTS

| 2016/0366435 | A1* | 12/2016 | Chien .................. H04N 19/172 |
| 2018/0070105 | A1 | 3/2018 | Jin et al. |
| 2018/0077425 | A1 | 3/2018 | Park et al. |
| 2019/0174136 | A1* | 6/2019 | Jun ...................... H04N 19/593 |

FOREIGN PATENT DOCUMENTS

| KR | 20170108010 | 9/2017 |
| WO | WO2012119777 | 9/2012 |
| WO | WO2016165617 | 10/2016 |
| WO | WO2017195608 | 11/2017 |
| WO | WO2019199141 | 10/2019 |

OTHER PUBLICATIONS

PCT International Search Report in International Appln. No. PCT/KR2019/003825, dated Jul. 22, 2019, 11 pages (with English translation).

Chen et al., "Coding tools investigation for next generation video coding based on HEVC," Proceedings of SPIE, IEEE, vol. 9599, dated Sep. 22, 2015, XP060060836, 9 pages.

EP Extended European Search Report in European Appln. No. 19782367.7, dated Mar. 31, 2021, 10 pages.

Office Action in Japanese Appln. No. 2021-502683, dated Dec. 7, 2021, 8 pages (with English translation).

* cited by examiner

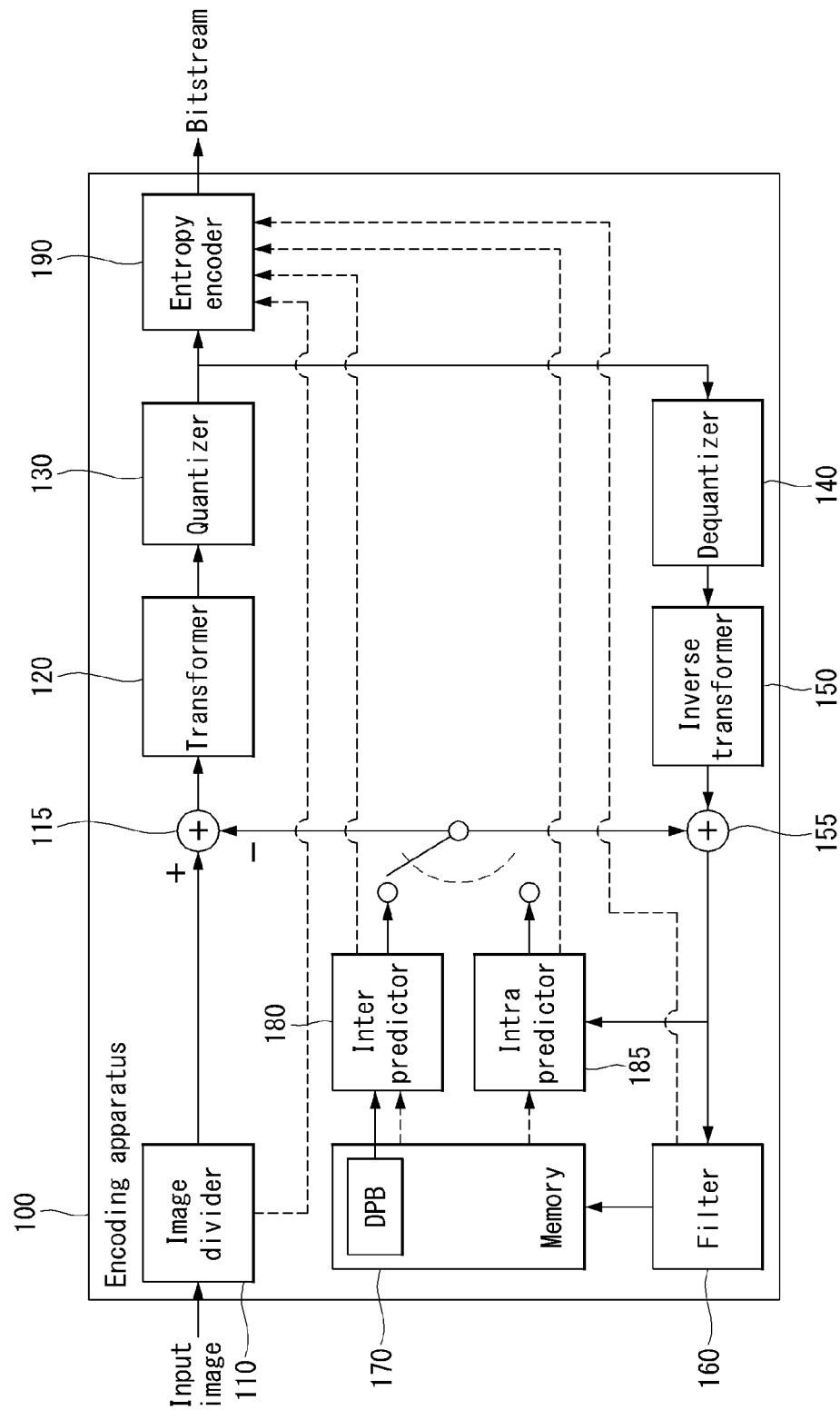
[FIG. 1]

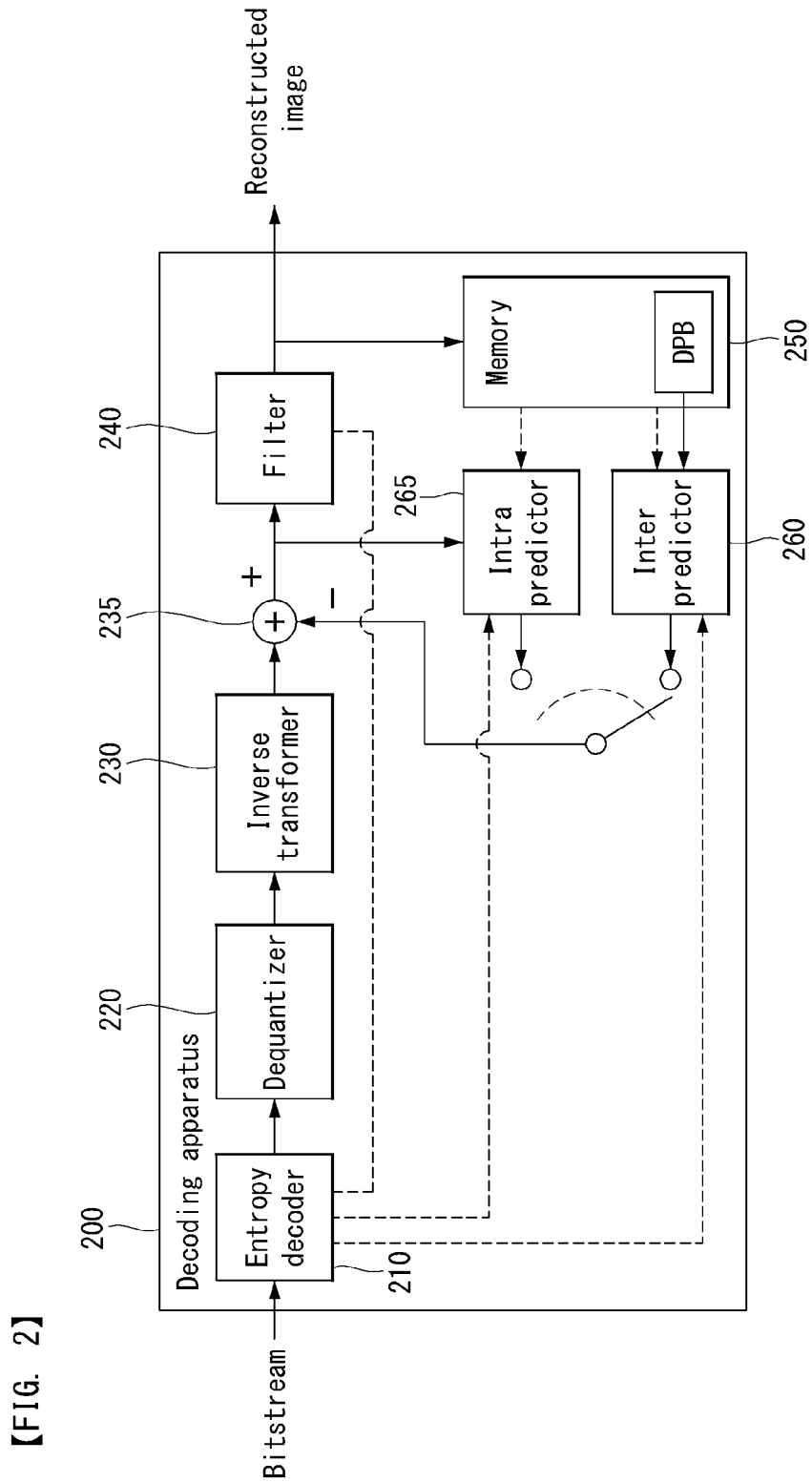
[FIG. 2]

[FIG. 3]
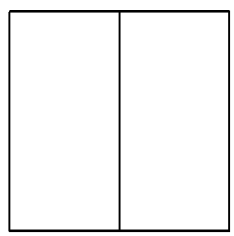 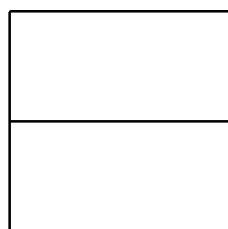 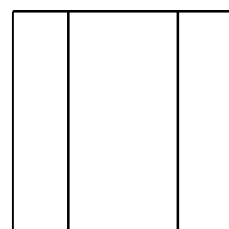 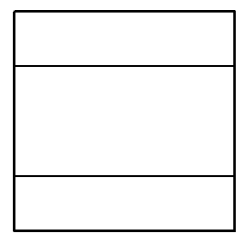
SPLIT_BT_VER    SPLIT_BT_HOR    SPLIT_TT_VER    SPLIT_TT_HOR

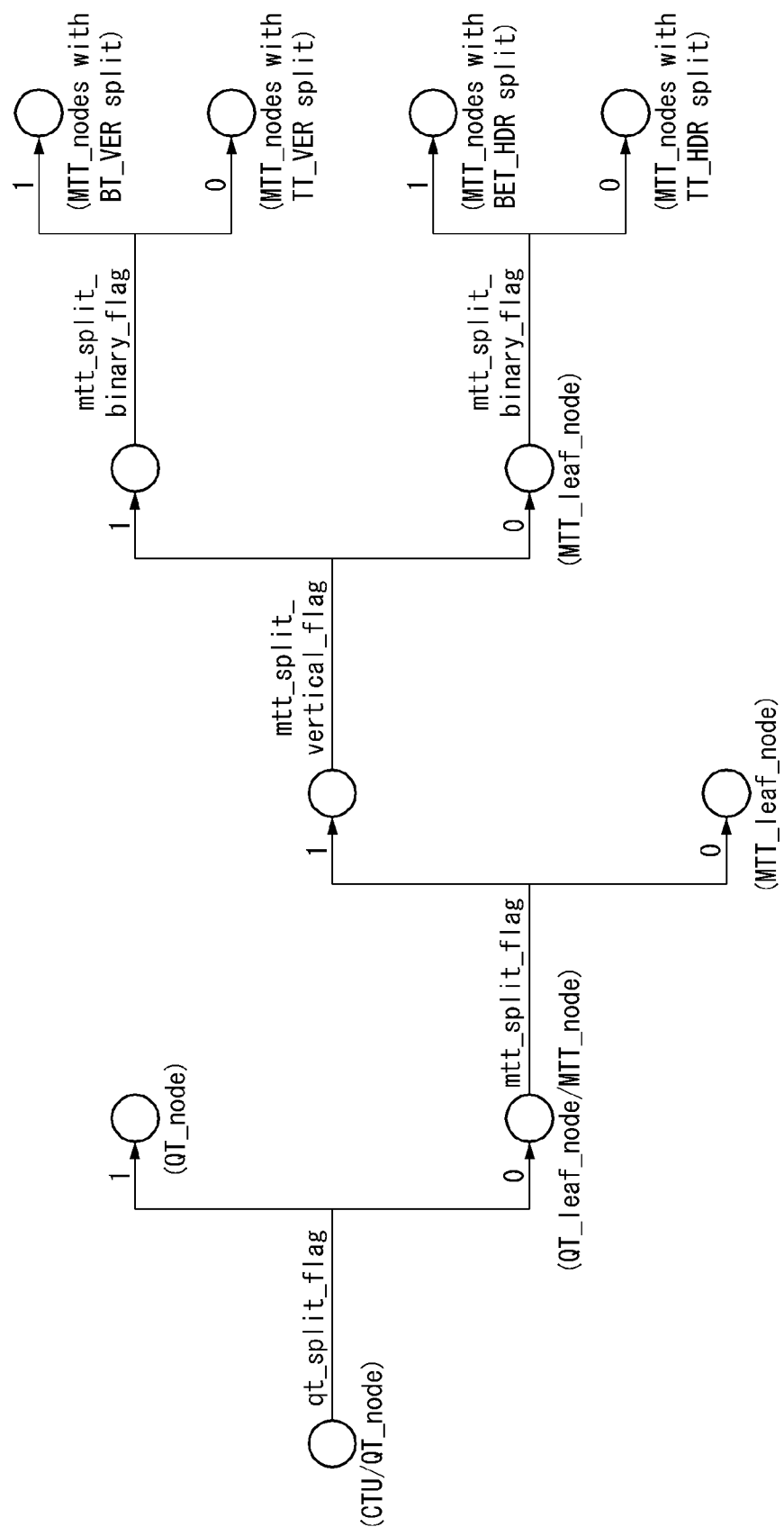
[FIG. 4]

[FIG. 5]
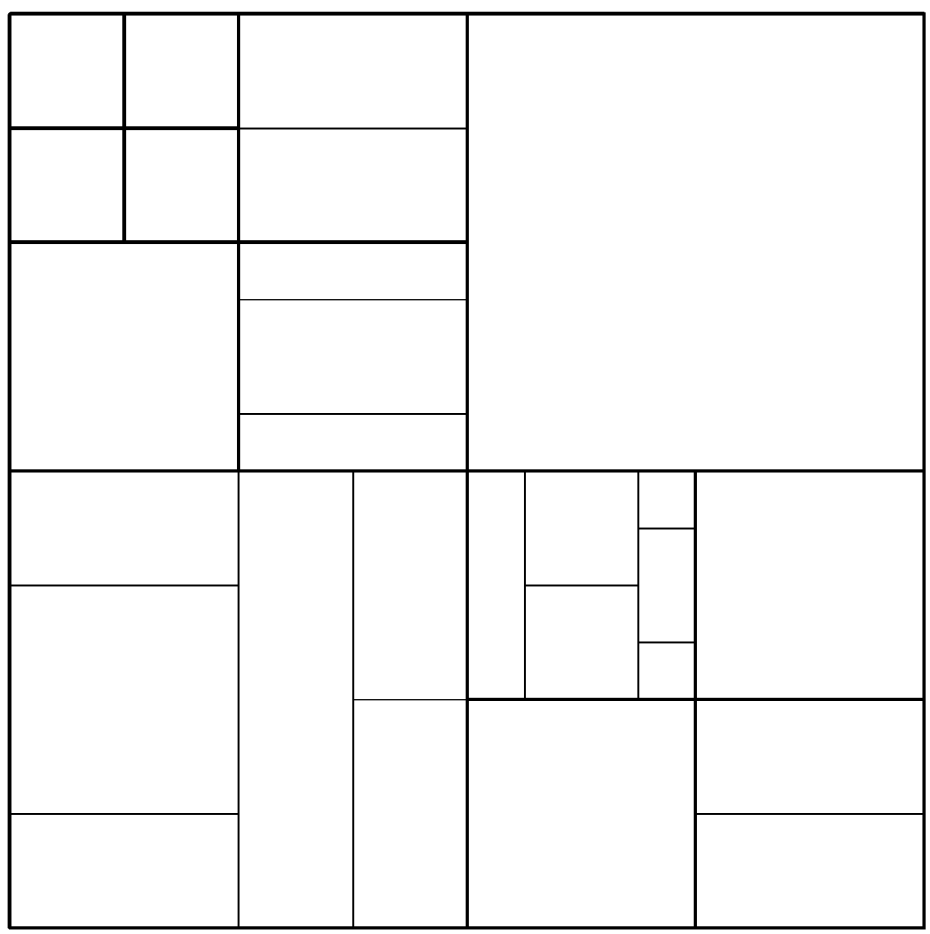

[FIG. 6]
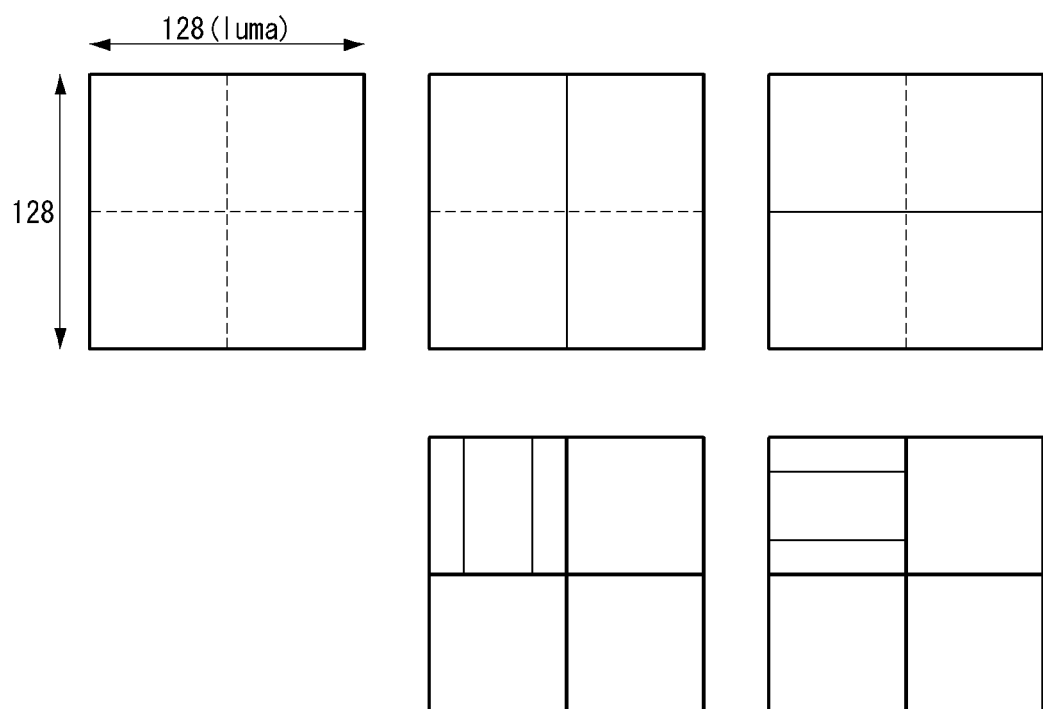
[FIG. 7]
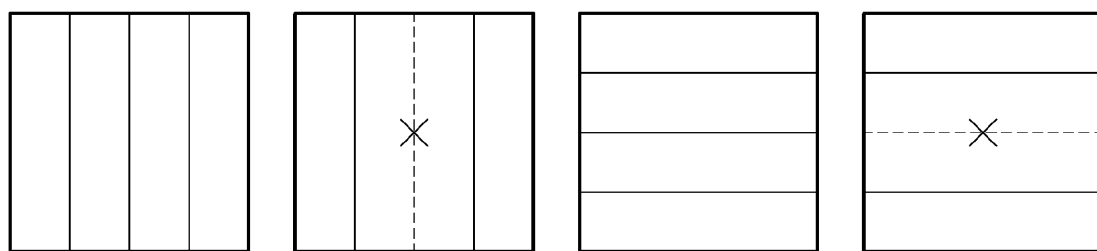

[FIG. 8]
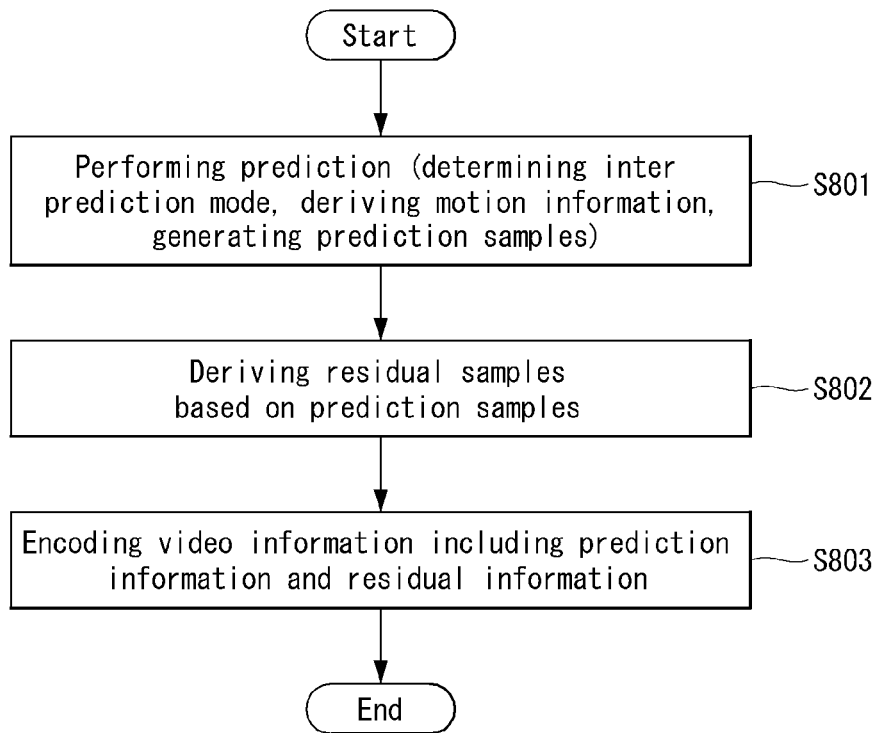
[FIG. 9]
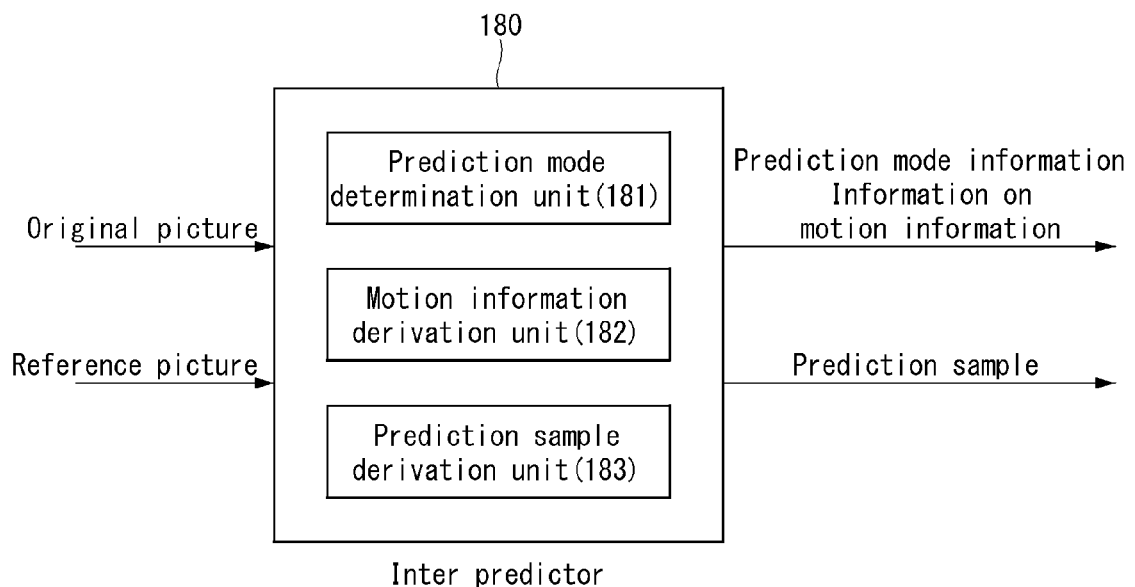

[FIG. 10]
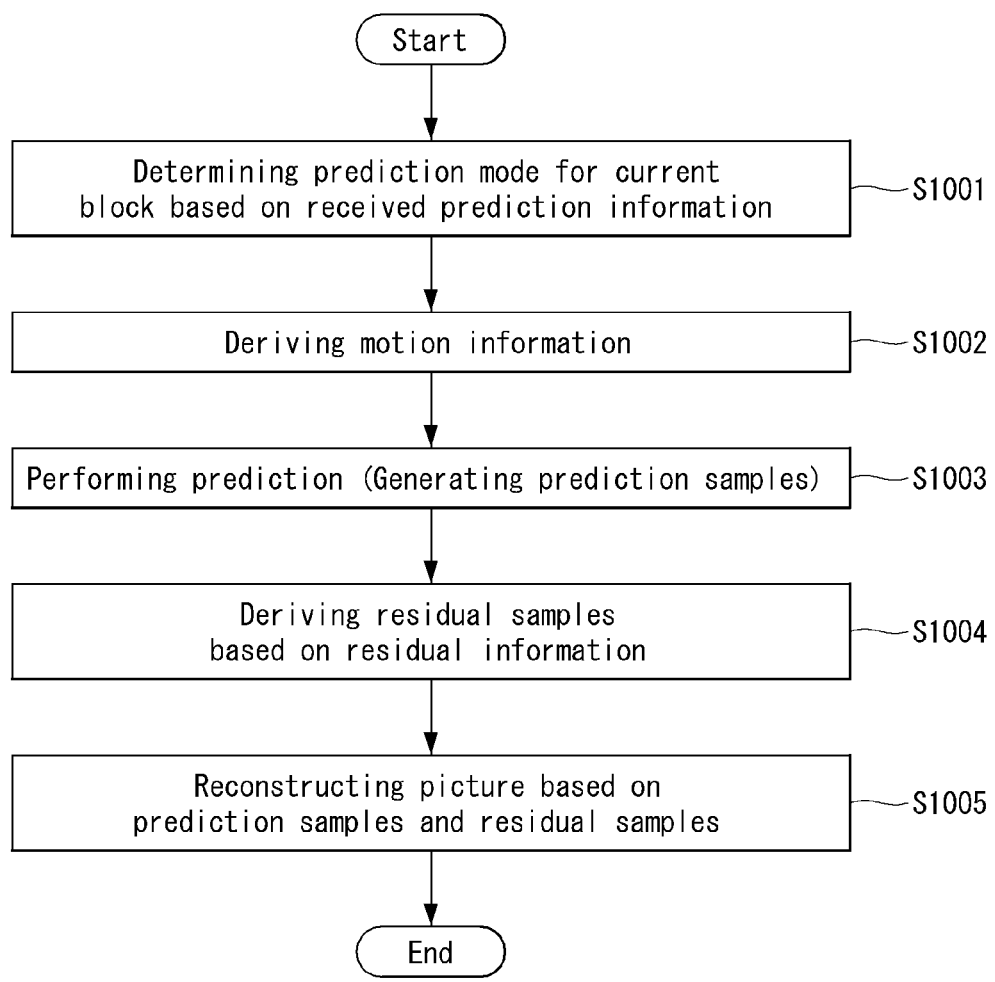

[FIG. 11]
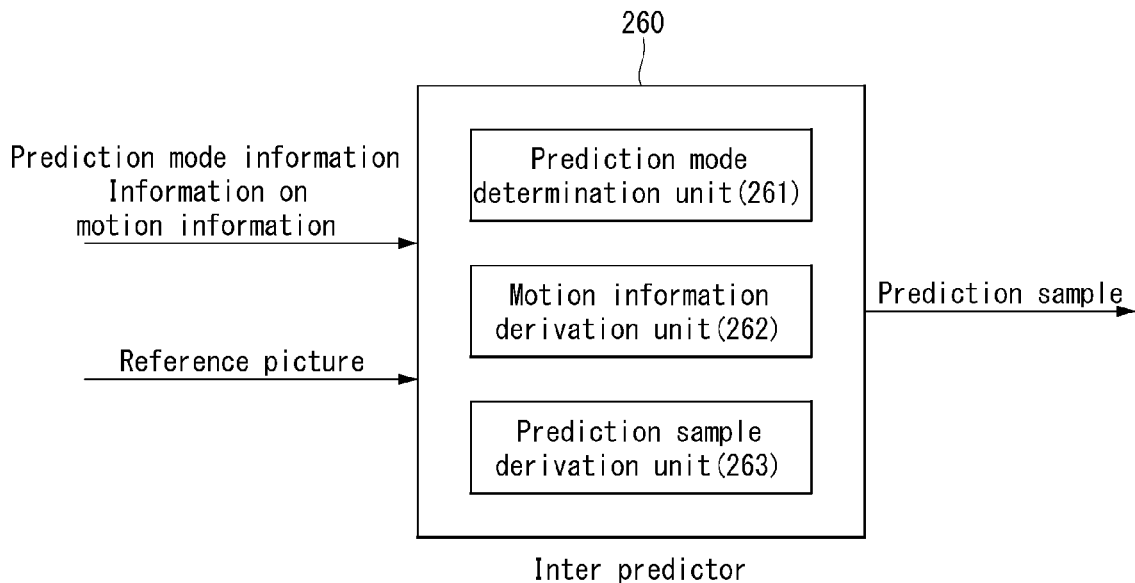
Inter predictor
[FIG. 12]
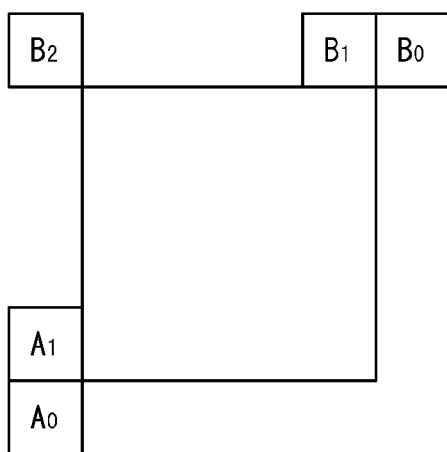

[FIG. 13]
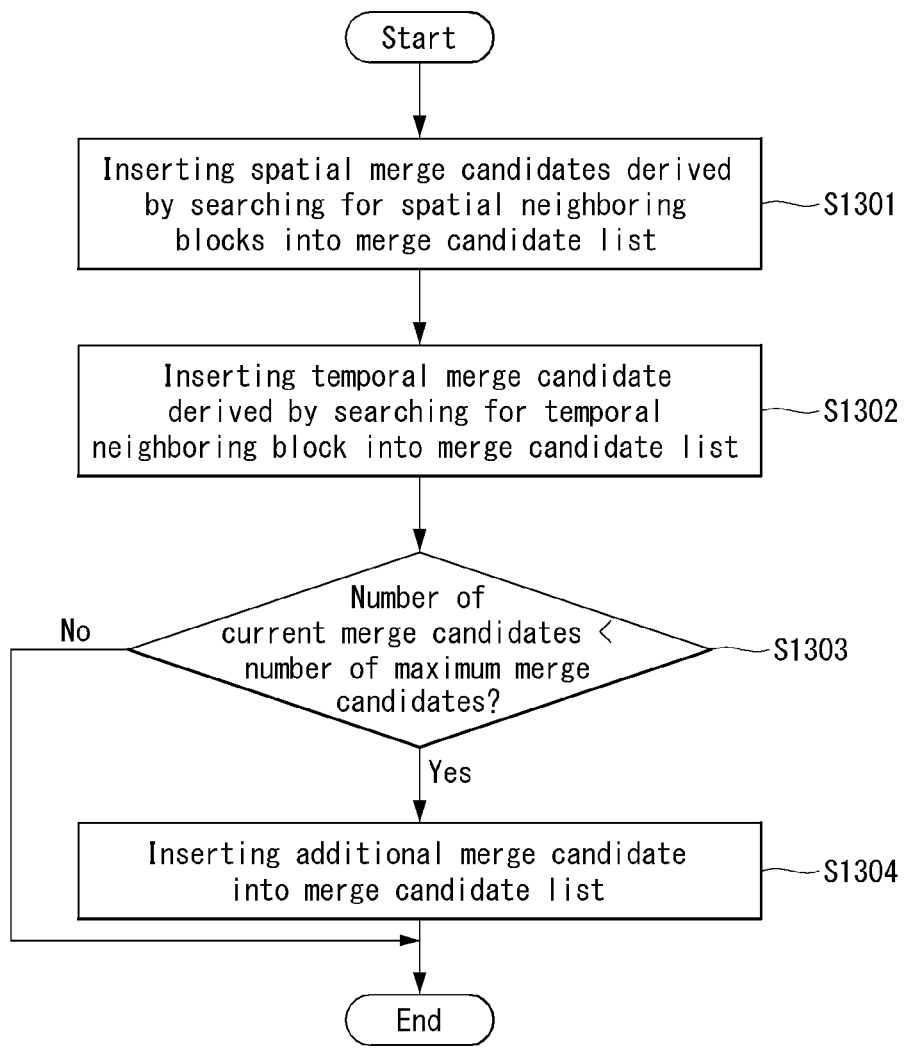

[FIG. 14]
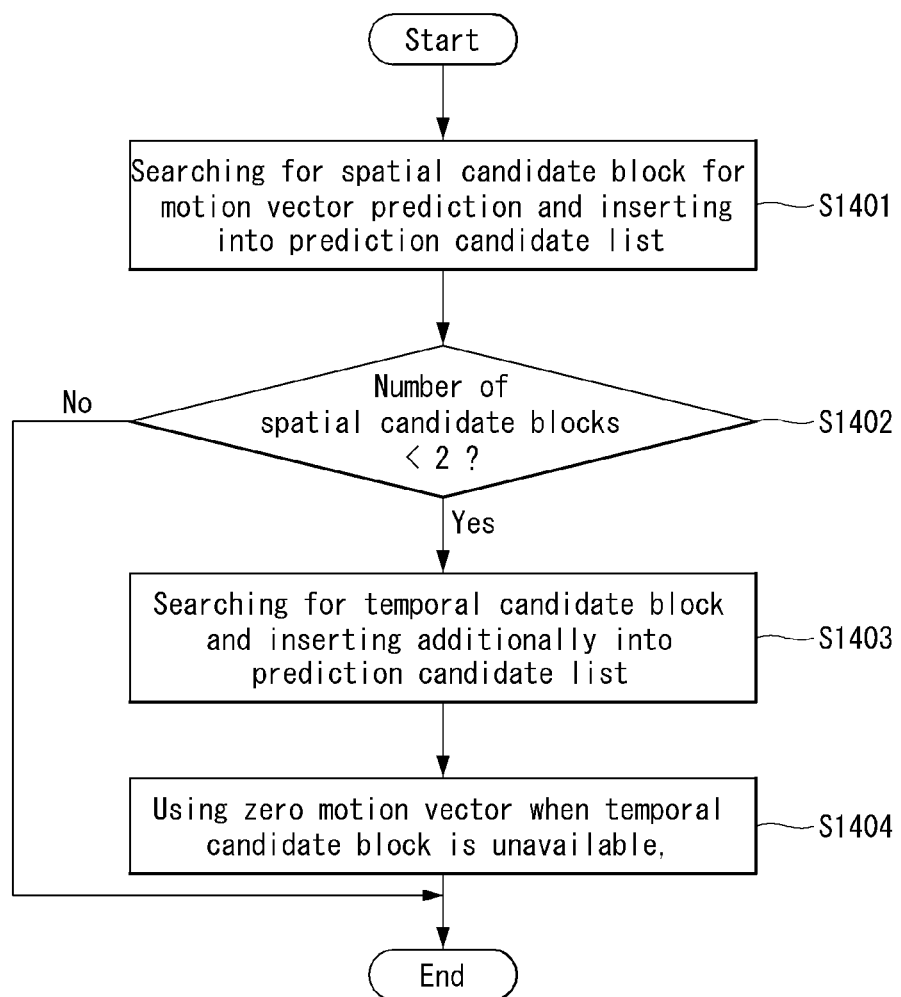

[FIG. 15]
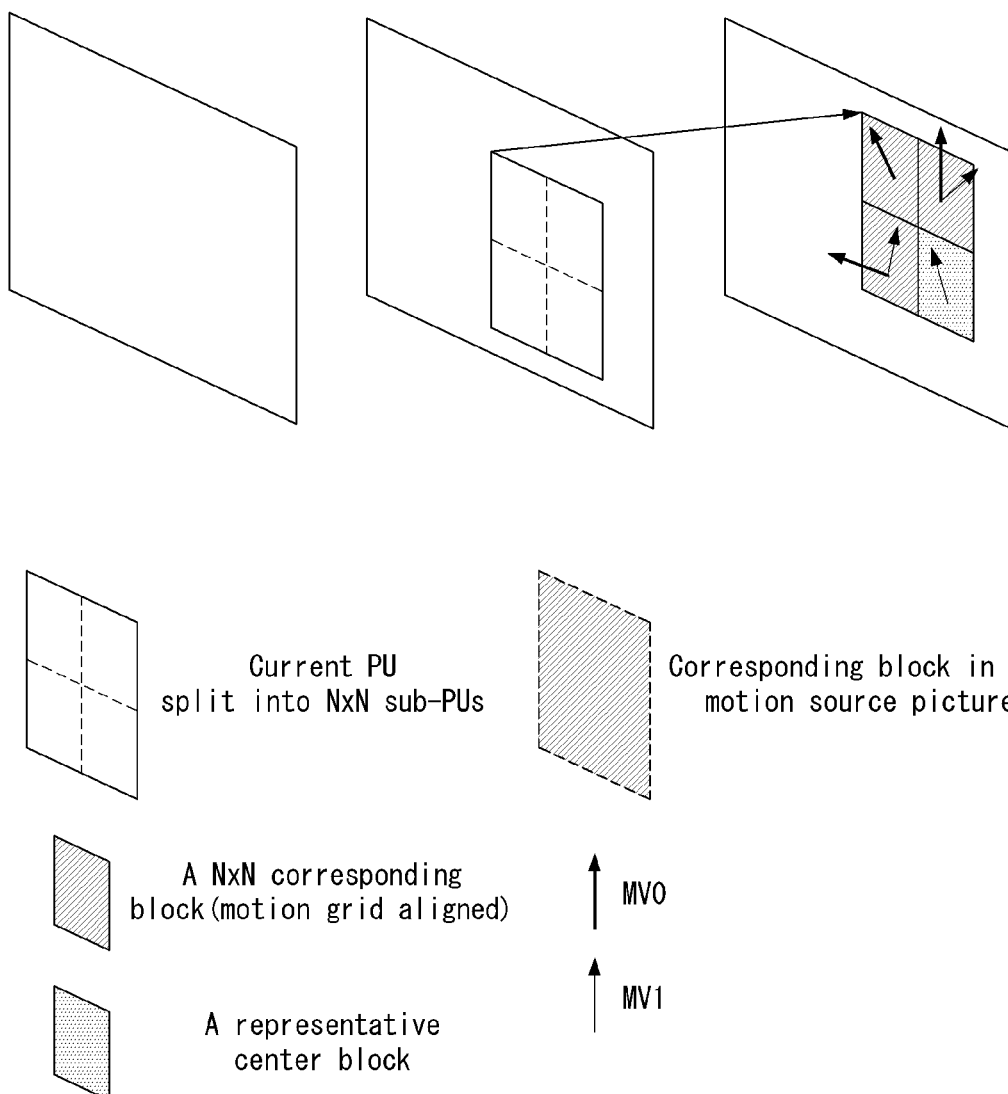

[FIG. 16]
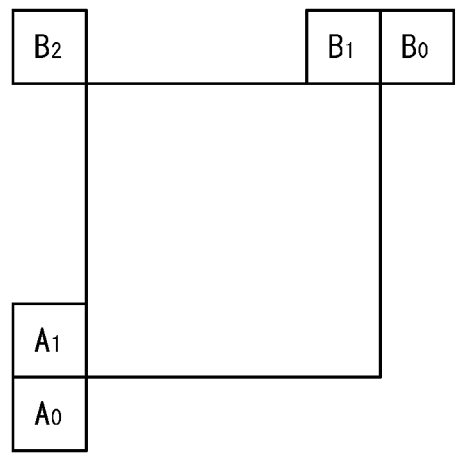
[FIG. 17]
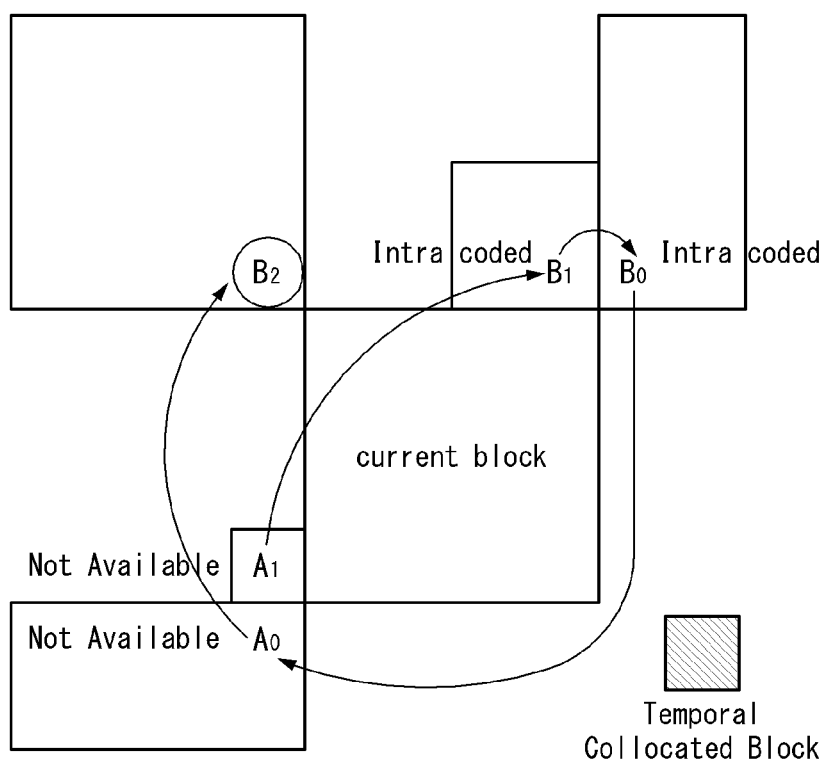

[FIG. 18]
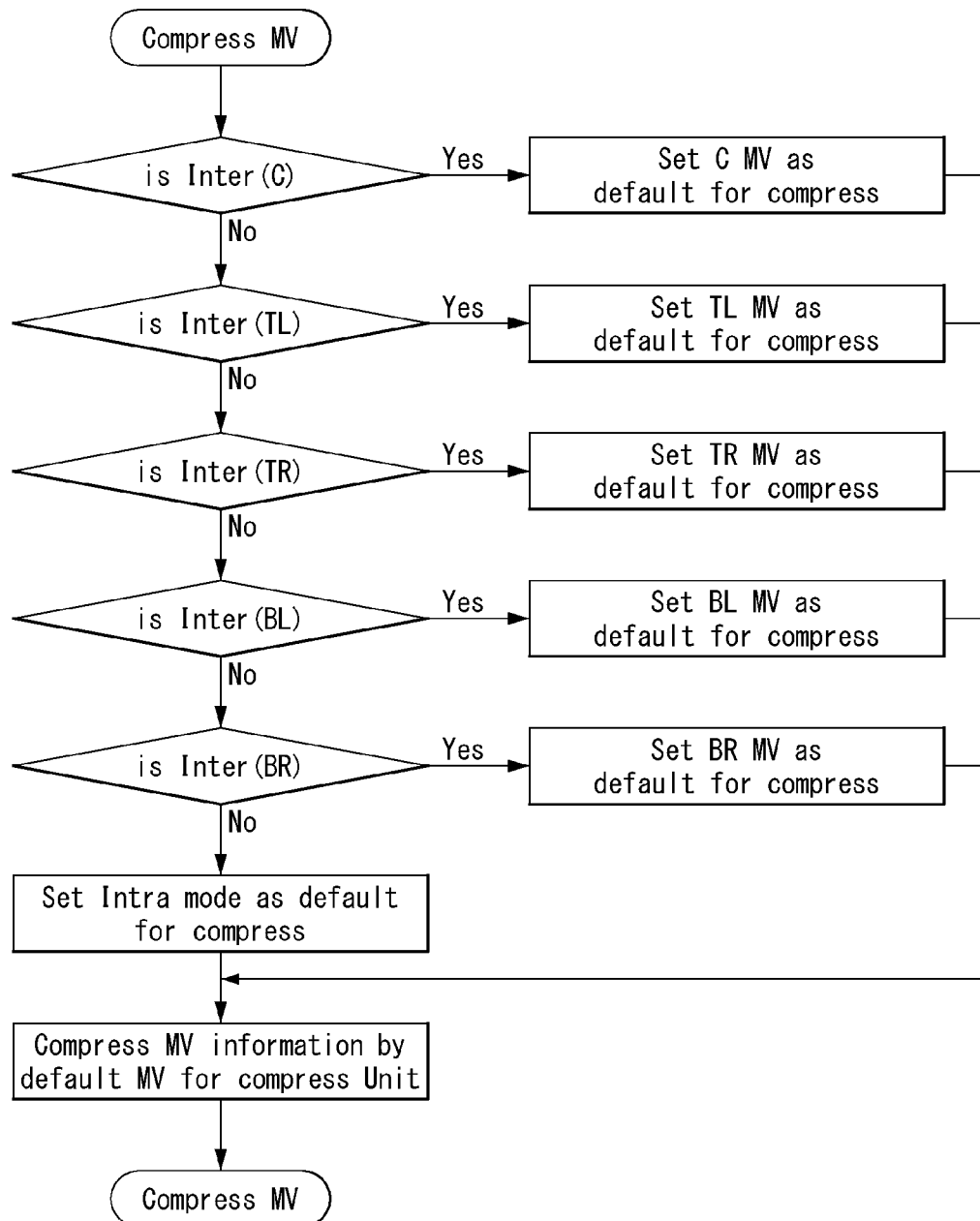

[FIG. 19]
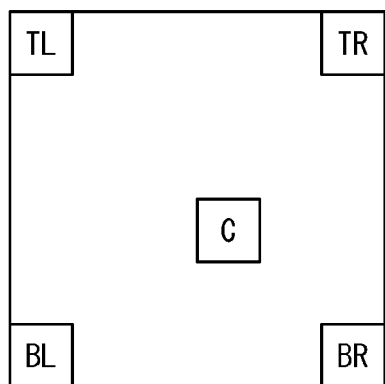
[FIG. 20]
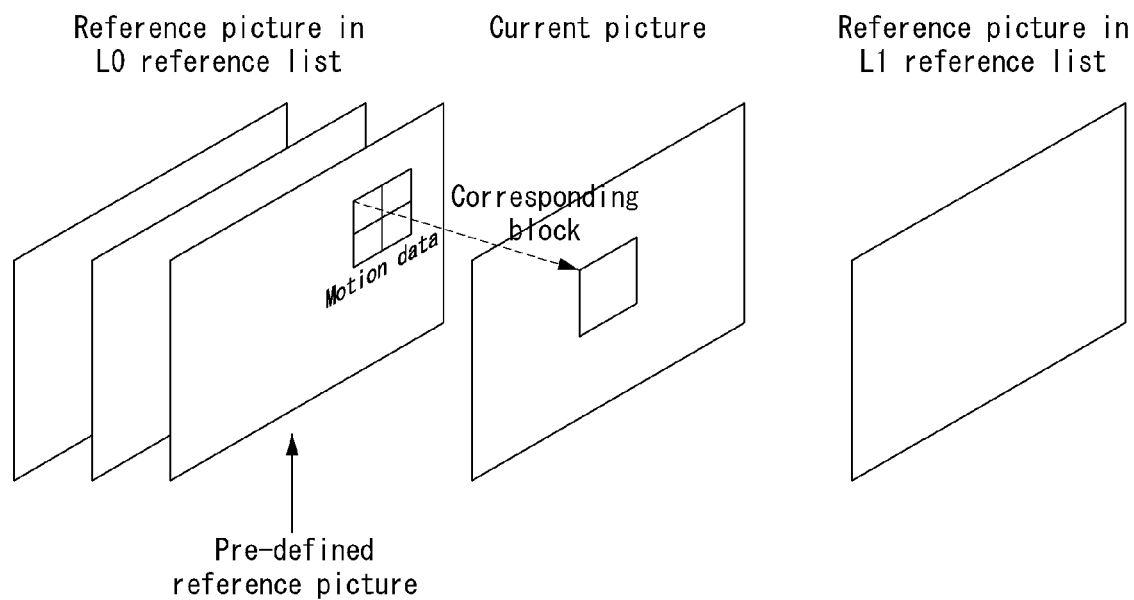

[FIG. 21]
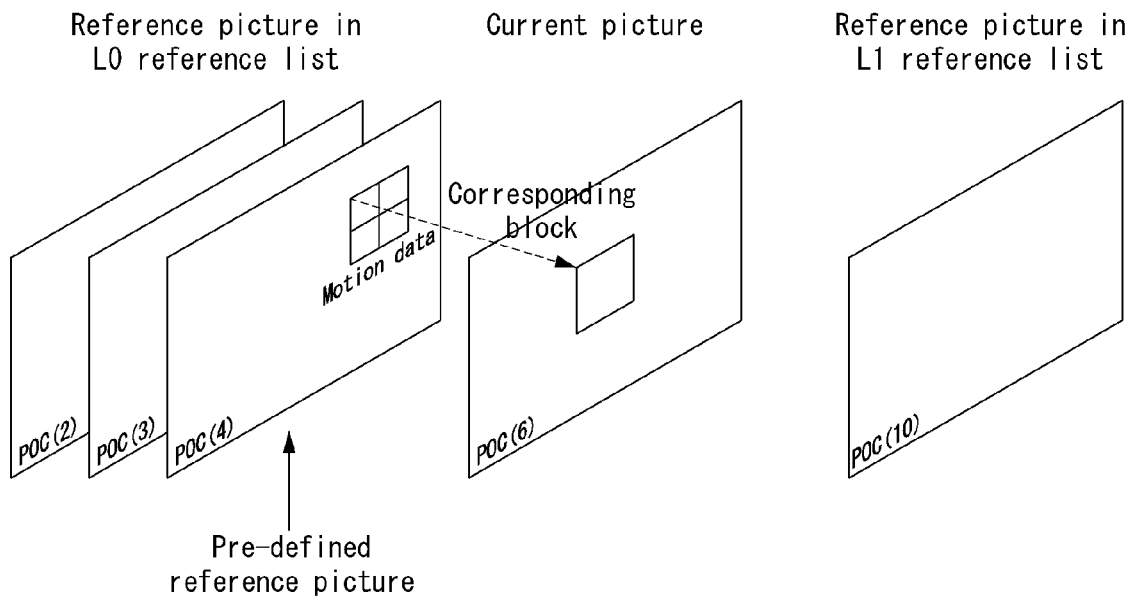
[FIG. 22]
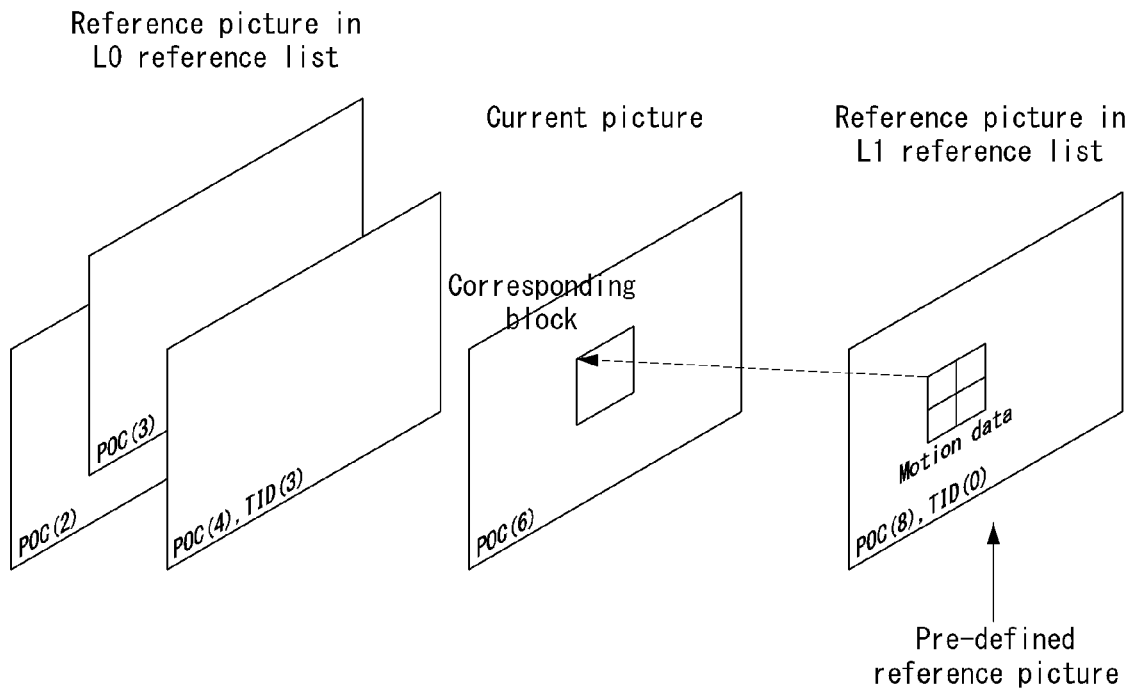

[FIG. 23]
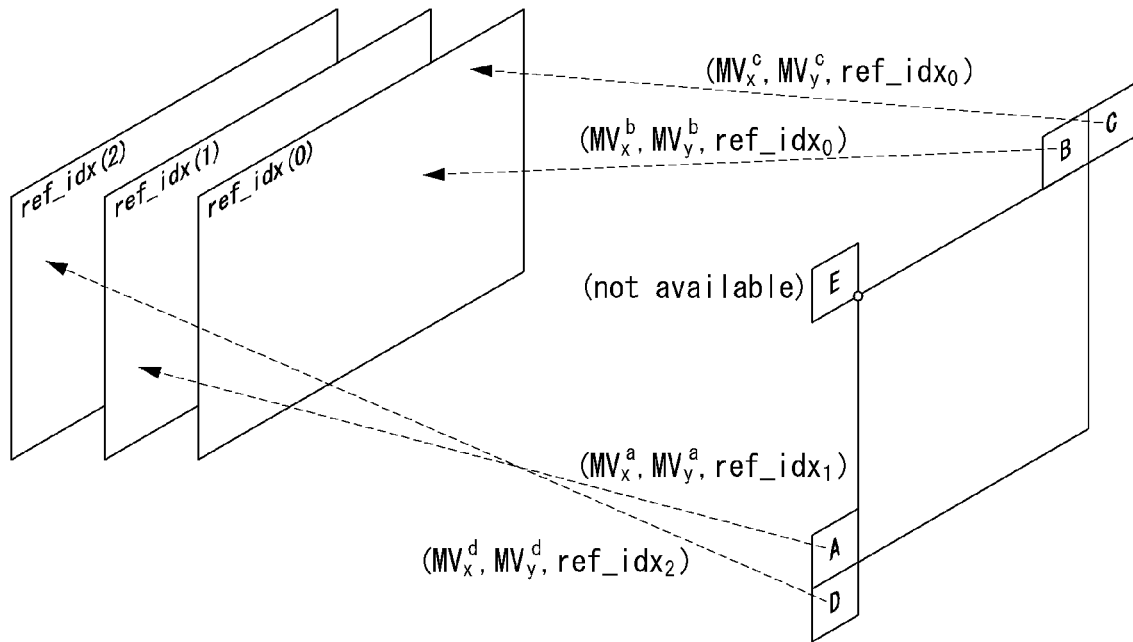
[FIG. 24]
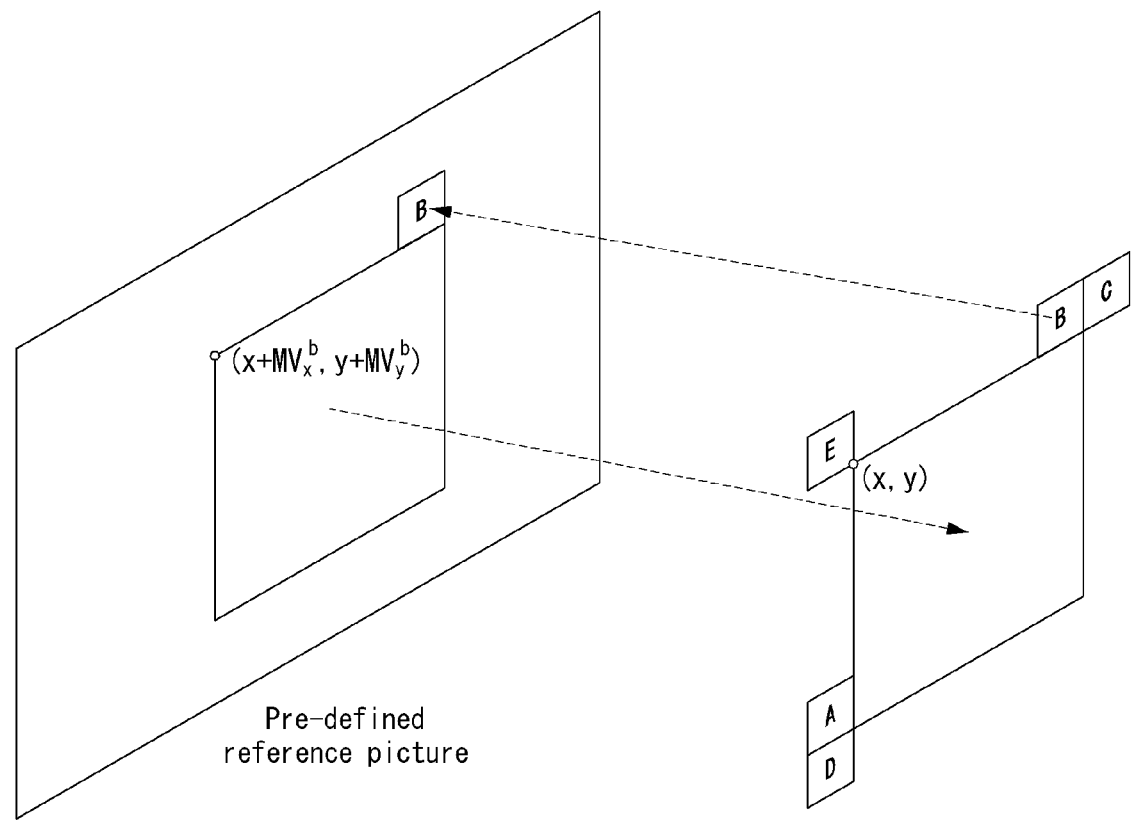

【FIG. 25】
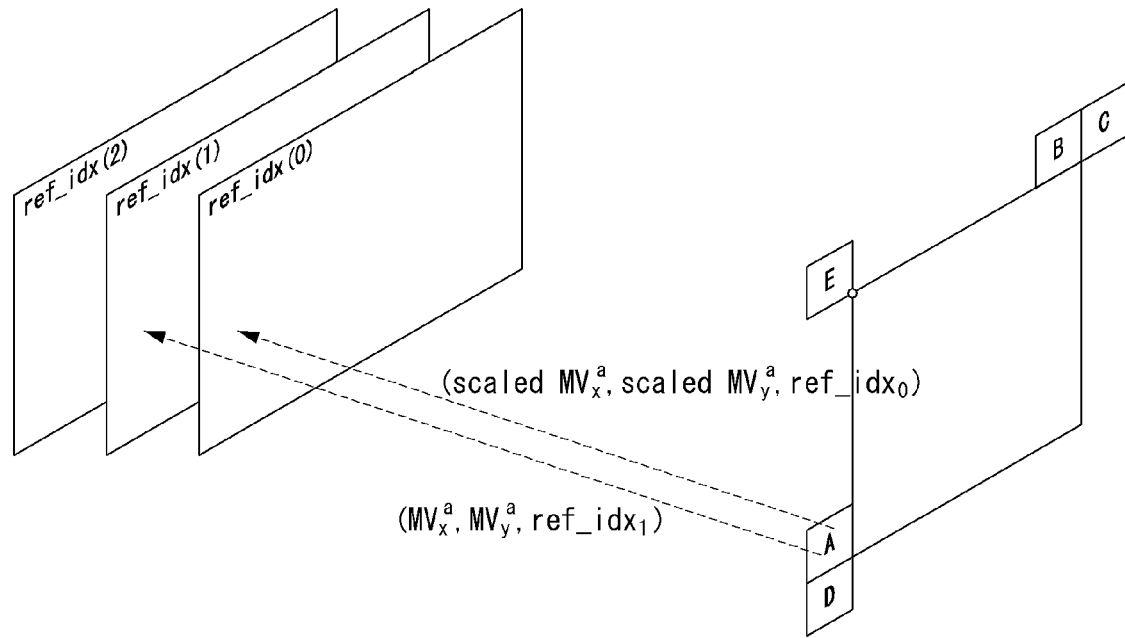
【FIG. 26】
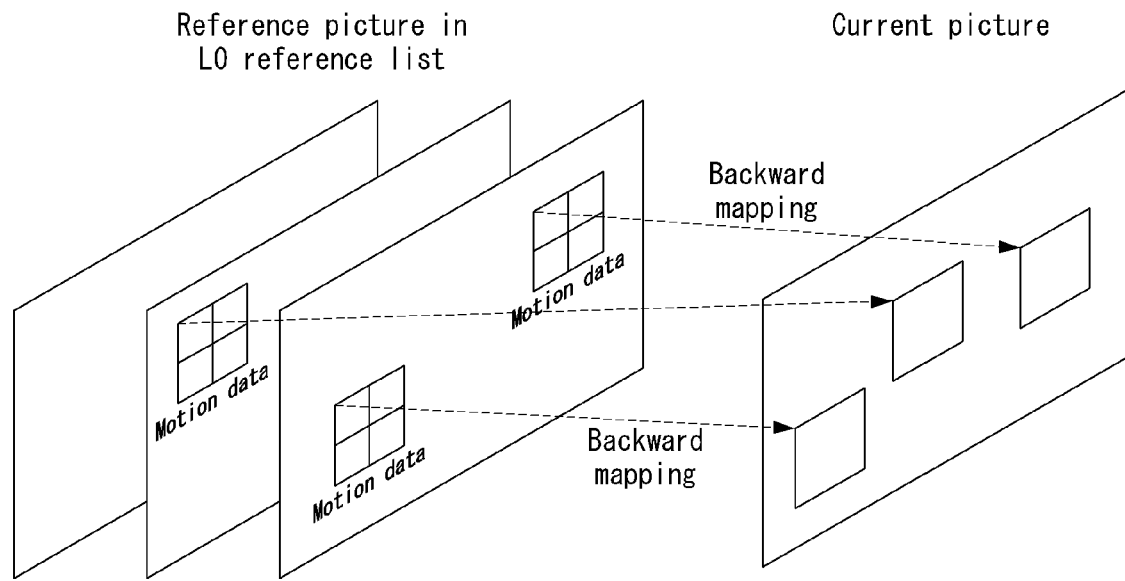

[FIG. 27]
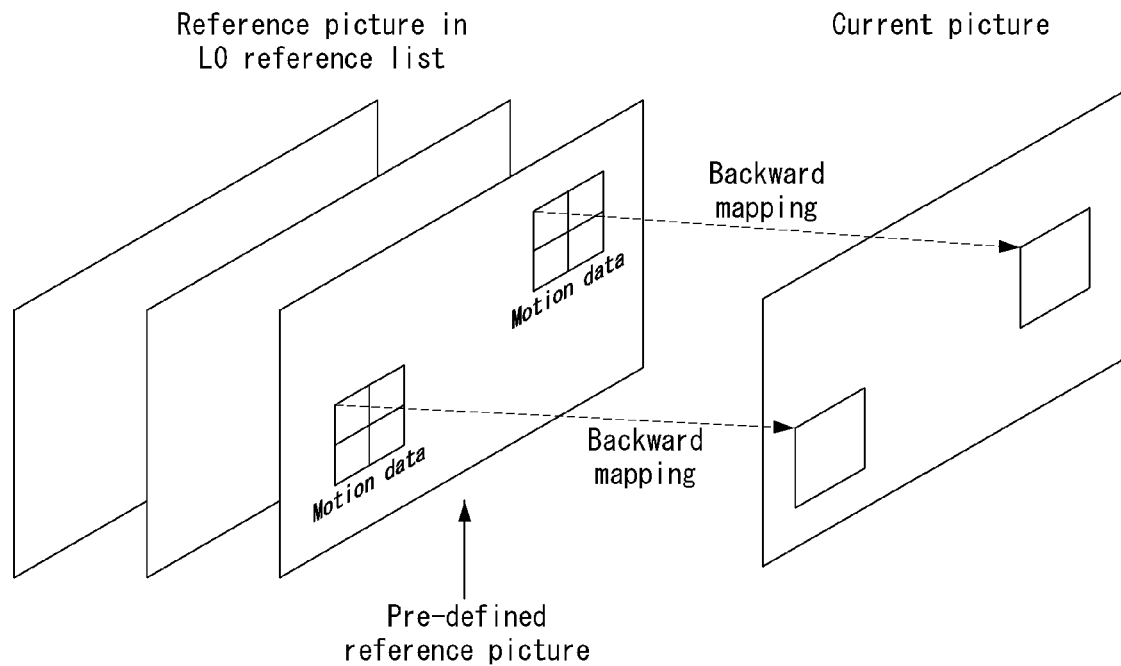
[FIG. 28]
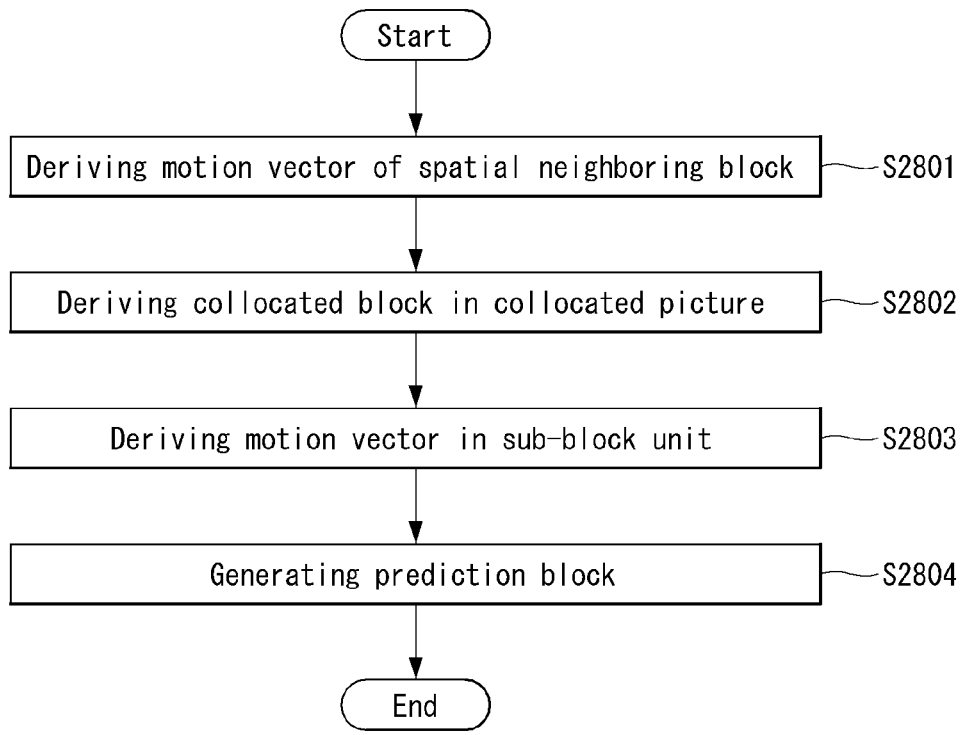

[FIG. 29]
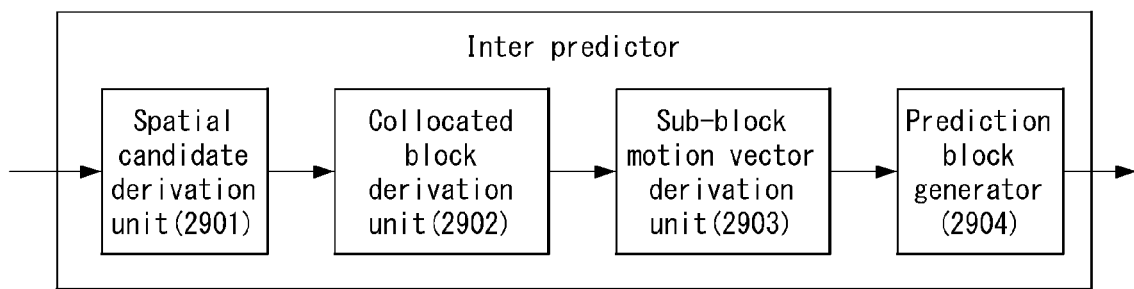
[FIG. 30]
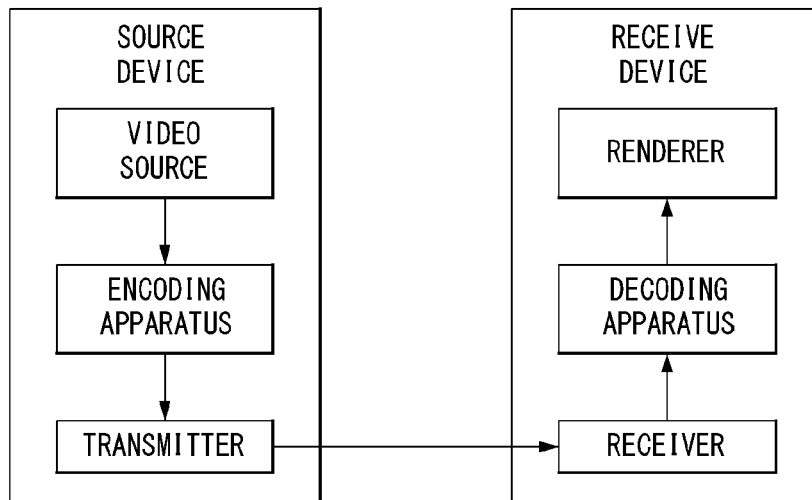

[FIG. 31]
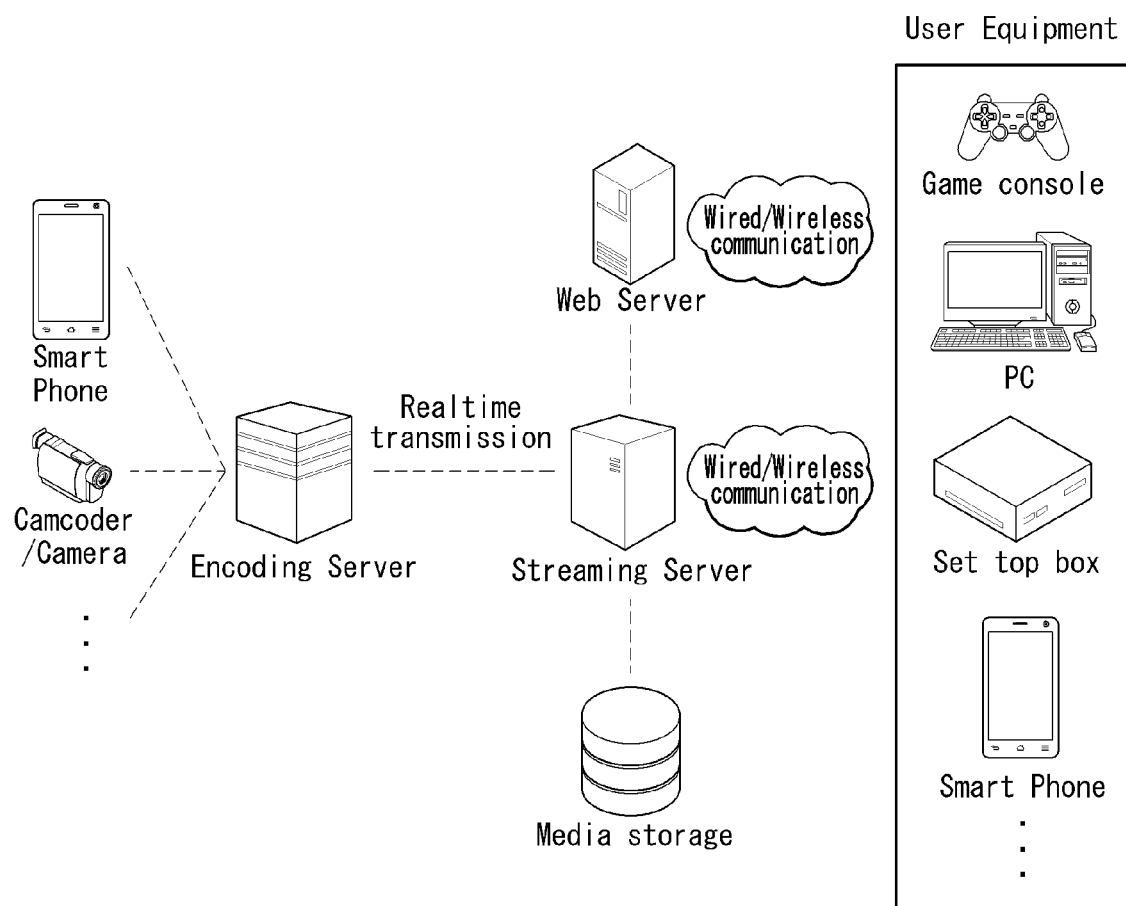

IMAGE PROCESSING METHOD BASED ON INTER PREDICTION MODE, AND DEVICE THEREFOR

CROSS-REFERENCE TO RELATED APPLICATIONS

Pursuant to 35 U.S.C. 21 119(e) this application is a continuation of International Application No. PCT/KR2019/003825, with an international filing date of Apr. 1, 2019, which claims the benefit of U.S. Provisional Applications No. 62/651,229, filed on Apr. 1, 2018, the contents of which are all hereby incorporated by reference herein in their entirety.

TECHNICAL FIELD

The present disclosure relates to a still image or video processing method, and more specifically, to a method of encoding/decoding a still image or video based on an inter prediction mode, and a device supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DETAILED DESCRIPTION

An object of the present disclosure is to propose a method of deriving a temporal motion vector from one reference picture.

In addition, an object of the present disclosure is to propose a method of selecting one reference picture for deriving a temporal motion vector by a signaled syntax.

In addition, an object of the present disclosure is to propose a method of selecting one reference picture for deriving a temporal motion vector based on a picture order count.

In addition, an object of the present disclosure is to propose a method of selecting a spatial candidate for deriving Advanced Temporal Motion Vector Prediction (ATMVP).

In addition, an object of the present disclosure is to propose a method of deriving a temporal motion vector based on backward mapping from one reference picture.

Technical objects to be achieved by the present disclosure are not limited to the aforementioned technical objects, and other technical objects not described above may be evidently understood by a person having ordinary skill in the art to which the present disclosure pertains from the following description.

One aspect of the present disclosure, in a method of decoding an image based on an inter prediction mode, includes deriving a motion vector of an available spatial neighboring block around a current block; deriving a collocated block of the current block based on the motion vector of the spatial neighboring block; deriving a motion vector in a sub-block unit in the current block based on a motion vector of the collocated block; and generating a prediction block of the current block using the motion vector derived in the sub-block unit, wherein the collocated block may be specified by the motion vector of the spatial neighboring block in one pre-defined reference picture.

Preferably, the deriving the collocated block may further include scaling the motion vector of the spatial neighboring block based on a picture order count (POC).

Preferably, the deriving the collocated block may further include scaling the motion vector of the spatial neighboring block based on a picture order count (POC) difference between a first reference picture of the spatial neighboring block and a second reference picture of a block specified by the motion vector of the spatial neighboring block, and a POC difference between a current picture and the one pre-defined reference picture; and deriving the collocated block in the one pre-defined reference picture using the scaled motion vector.

Preferably, the one pre-defined reference picture may be signaled from an encoder through a sequence parameter set, a picture parameter set, or a tile group header.

Preferably, the one pre-defined reference picture may be defined as a reference picture closest to a current picture based on a POC in a reference picture list of the current block.

Preferably, the one pre-defined reference picture may be defined as a reference picture having a smallest temporal ID among the reference pictures when there are a plurality of reference pictures closest to the current picture based on the POC in the reference picture list of the current block.

Another aspect of the present disclosure, in a device of decoding an image based on an inter prediction mode, includes a spatial candidate derivation unit configured to derive a motion vector of an available spatial neighboring block around a current block; a collocated block derivation unit configured to derive a collocated block of the current block based on the motion vector of the spatial neighboring block; a sub-block motion vector derivation unit configured to derive a motion vector in a sub-block unit in the current block based on a motion vector of the collocated block; and a prediction block generator configured to generate a prediction block of the current block using the motion vector derived in the sub-block unit, wherein the collocated block may be specified by the motion vector of the spatial neighboring block in one pre-defined reference picture.

Preferably, the collocated block derivation unit may scale the motion vector of the spatial neighboring block based on a picture order count (POC).

Preferably, the collocated block derivation unit may be configured to scale the motion vector of the spatial neighboring block based on a picture order count (POC) difference between a first reference picture of the spatial neighboring block and a second reference picture of a block specified by the motion vector of the spatial neighboring block, and a POC difference between a current picture and the one pre-defined reference picture, and derive the collocated block in the one pre-defined reference picture using the scaled motion vector.

Preferably, the one pre-defined reference picture may be signaled from an encoder through a sequence parameter set, a picture parameter set, or a tile group header.

Preferably, the one pre-defined reference picture may be defined as a reference picture closest to a current picture based on a POC in a reference picture list of the current block.

Preferably, the one pre-defined reference picture may be defined as a reference picture having a smallest temporal ID among the reference pictures when there are a plurality of reference pictures closest to the current picture based on the POC in the reference picture list of the current block.

According to an embodiment of the present disclosure, a memory bandwidth can be reduced, and an additional line buffer problem can be solved.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present invention and constitute a part of the detailed description, illustrate embodiments of the present invention and together with the description serve to explain the principle of the present invention.

FIG. 1 is a schematic block diagram of an encoding apparatus which encodes a video/image signal as an embodiment to which the present disclosure is applied.

FIG. 2 is a schematic block diagram of a decoding apparatus for decoding a video/image signal as an embodiment to which the disclosure is applied.

FIG. 3 is a diagram illustrating an example of a multi-type tree structure as an embodiment to which the present disclosure may be applied.

FIG. 4 is a diagram illustrating a signaling mechanism of partition split information of a quadtree with nested multi-type tree structure as an embodiment to which the present disclosure may be applied.

FIG. 5 is a diagram illustrating a method of partitioning a CTU into multiple CUs based on a quadtree and nested multi-type tree structure as an embodiment to which the present disclosure may be applied.

FIG. 6 is a diagram illustrating a method for limiting a ternary-tree split as an embodiment to which the present disclosure may be applied.

FIG. 7 is a diagram illustrating redundant split patterns that may be generated in binary-tree split and ternary-tree split as an embodiment to which the present disclosure may be applied.

FIGS. 8 and 9 are diagrams illustrating a video/image encoding method based on an inter prediction according to an embodiment of the present disclosure and an inter predictor in an encoding apparatus according to an embodiment of the present disclosure.

FIGS. 10 and 11 are diagrams illustrating a video/image decoding method based on an inter prediction according to an embodiment of the present disclosure and an inter predictor in a decoding apparatus according to an embodiment of the present disclosure.

FIG. 12 is a diagram illustrating a neighboring block used in a merge mode or a skip mode as an embodiment to which the present disclosure is applied.

FIG. 13 is a flowchart illustrating a method of constructing a merge candidate list according to an embodiment to which the present disclosure is applied.

FIG. 14 is a flowchart illustrating a method of constructing a merge candidate list according to an embodiment to which the present disclosure is applied.

FIGS. 15 and 16 are diagrams for explaining a method of deriving an Advanced Temporal Motion Vector Prediction (ATMVP) candidate as an embodiment to which the present disclosure is applied.

FIG. 17 is a diagram illustrating a method of deriving an Advanced Temporal Motion Vector Prediction (ATMVP) candidate as an embodiment to which the present disclosure is applied.

FIGS. 18 and 19 are diagrams illustrating a method of compressing temporal motion vector data and locations of spatial candidates used therein according to an embodiment to which the present disclosure is applied.

FIG. 20 is a diagram illustrating a method of deriving a temporal motion vector using a fixed reference picture according to an embodiment to which the present disclosure is applied.

FIG. 21 is a diagram illustrating a method of deriving a fixed reference picture for a temporal motion vector prediction as an embodiment to which the present disclosure is applied.

FIG. 22 is a diagram illustrating a method of deriving a fixed reference picture for a temporal motion vector prediction as an embodiment to which the present disclosure is applied.

FIGS. 23 and 24 are diagrams illustrating a method of selecting a spatial candidate used to derive an ATMVP candidate and a method of performing motion compensation in a sub-block unit using a selected spatial candidate as an embodiment to which the present disclosure is applied.

FIG. 25 is a diagram illustrating a method of deriving a temporal motion vector according to an embodiment to which the present disclosure is applied.

FIGS. 26 and 27 are diagrams illustrating a method of deriving a temporal motion vector using backward mapping according to an embodiment of the present disclosure.

FIG. 28 is a flowchart illustrating a method of generating an inter prediction block according to an embodiment to which the present disclosure is applied.

FIG. 29 is a diagram illustrating an inter prediction device according to an embodiment to which the present disclosure is applied.

FIG. 30 illustrates a video coding system to which the present disclosure is applied.

FIG. 31 is a configuration diagram of a content streaming system as an embodiment to which the present disclosure is applied.

SUMMARY

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the present disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loéve transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the present disclosure may be performed based on various detailed techniques, and each of the various detailed techniques is described as below. It is apparent to those skilled in the art that the techniques described herein may be associated with the related procedure such as a prediction, a residual process ((inverse) transform, (de)quantization, etc.), a syntax element coding, a filtering, a partitioning/splitting in a video/image encoding/decoding procedure described above and/or described below.

The block partitioning procedure according to the present disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include a N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the present disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

FIG. 3 is a diagram illustrating an example of a multi-type tree structure as an embodiment to which the present disclosure may be applied.

In an embodiment of the present disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the present disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree with nested multi-type tree structure as an embodiment to which the present disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_ split_cu_binary_flag, a multi-type tree splitting mode (Mtt-SplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the present disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the present disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.
  CTU size: the root node size of a quaternary tree
  MinQTSize: the minimum allowed quaternary tree leaf node size
  MaxBtSize: the maximum allowed binary tree root node size
  MaxTtSize: the maximum allowed ternary tree root node size
  MaxMttDepth: the maximum allowed hierarchy depth of multi-type tree splitting from a quadtree leaf
  MinBtSize: the minimum allowed binary tree leaf node size
  MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtsize (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the present disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the present disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT split type) and a syntax element including information a direction to which a leaf node of QT structure is partitioned between vertical and horizontal directions (e.g., MPT split mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries, If the block is a QT node and the size of the block is larger than the minimum QT size, the block is forced to be split with QT split mode.

Otherwise, the block is forced to be split with SPLIT_BT_HOR mode

Otherwise if a portion of a tree node block exceeds the bottom picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_HOR mode.

Otherwise (the block is a BTT node or the size of the block is smaller than or equal to the minimum QT size), the block is forced to be split with SPLIT_BT_HOR mode.

Otherwise if a portion of a tree node block exceeds the right picture boundaries, If the block is a QT node, and the size of the block is larger than the minimum QT size, and the size of the block is larger than the maximum BT size, the block is forced to be split with QT split mode.

Otherwise, if the block is a QT node, and the size of the block is larger than the minimum QT size and the size of the block is smaller than or equal to the maximum BT size, the block is forced to be split with QT split mode or SPLIT_BT_VER mode.

Otherwise (the block is a BTT node or the size of the block is smaller than or equal to the minimum QT size), the block is forced to be split with SPLIT_BT_VER mode.

Meanwhile, the quad-tree coding tree scheme with nested multi-type tree described above may provide very flexible partitioning structure. Owing to the split types supported in the multi-type tree, different split patterns may bring a result of the same coding block structure in some cases. By limiting generations of such redundant split patterns, a data amount of partitioning information may be reduced. This is described with reference to the following drawing.

FIG. 7 is a diagram illustrating redundant split patterns that may be generated in binary-tree split and ternary-tree split as an embodiment to which the present disclosure may be applied.

As shown in FIG. 7, two levels of consecutive binary splits in one direction may have the same coding block structure as the binary split for a center partition after a ternary split. In this case, the binary-tree split for the center partition of the ternary-tree split may be limited (in the given direction). Such a limit may be applied to CUs of all pictures. In the case that such a specific split is limited, signaling of the corresponding syntax elements may be modified by reflecting the limited case, and through this, the number of bits signaled for partitioning may be reduced. For example, as exemplified in FIG. 7, in the case that the binary-tree split for the center partition of a CU is limited, mtt_split_cu_binary_flag syntax element that indicates whether a split is the binary split or the ternary split may not be signaled, and the value may be inferred by a decoder as 0.

Prediction

In order to reconstruct a current processing unit on which decoding is performed, a decoded part of a current picture or other pictures including the current processing unit may be used.

A picture (slice) that uses only the current picture for reconstruction, that is, performs only an intra prediction, may be referred to as an intra picture or an I picture (slice), a picture (slice) that uses maximum one motion vector and a reference index to predict each unit may be referred to as a predictive picture or a P picture (slice), and a picture (slice) that uses maximum two motion vectors and two reference indices may be referred to as a Bi-predictive picture or a B picture (slice).

The intra prediction refers to a prediction method of deriving a current processing block from data elements (e.g. sample values, etc.) of the same decoded picture (or slice). That is, it refers to a method of predicting a pixel value of the current processing block by referring to reconstructed areas in the current picture.

Hereinafter, an inter prediction will be described in more detail.

Inter Prediction (or Inter-Picture Prediction)

The inter prediction means a prediction method of deriving the current processing block based on data elements (e.g. sample values or motion vectors, etc.) of pictures other than the current picture. That is, it means a method of predicting a pixel value of the current processing block by referring to reconstructed areas in another reconstructed picture other than the current picture.

The inter prediction (or inter-picture prediction) is a technique that removes redundancy between pictures, and is mostly performed through motion estimation and motion compensation.

The present disclosure describes a detailed technique of the inter prediction method described in FIGS. 1 and 2 above, in the case of a decoder, and it may be represented by a video/image decoding method based on an inter prediction of FIG. 10 and an inter predictor in a decoding apparatus of FIG. 11 to be described later. In addition, in the case of an encoder, and it may represented by a video/image encoding method based on an inter prediction of FIG. 8 and an inter predictor in an encoding apparatus of FIG. 9 to be described later. In addition, data encoded through FIGS. 8 and 9 may be stored in a bitstream form.

The predictor of the encoding apparatus/decoding apparatus may derive a prediction sample by performing the inter prediction in a block unit. The inter prediction may represent a prediction derived by a method dependent on data elements (e.g. sample values, motion information, etc.) of a picture(s) other than the current picture. When the inter prediction is applied to a current block, based on a reference block (reference sample array) specified by a motion vector on a reference picture indicated by a reference picture index, a predicted block (prediction sample array) for the current block may be derived.

In this case, in order to reduce the amount of motion information transmitted in the inter prediction mode, motion information of the current block may be predicted in a unit of blocks, sub-blocks or samples based on the correlation of motion information between a neighboring block and the current block. The motion information may include a motion vector and a reference picture index. The motion information may further include inter prediction type (L0 prediction, L1 prediction, Bi prediction, etc.) information.

In the case of the inter prediction, the neighboring block may include a spatial neighboring block within the current picture and a temporal neighboring block within the reference picture. The reference picture including the reference block and the reference picture including the temporal neighboring block may be the same or different. The temporal neighboring block may be referred to as a collocated reference block or a colocated CU (colCU), and the reference picture including the temporal neighboring block may be referred to as a colocated picture (colPic). For example, a motion information candidate list may be configured based on neighboring blocks of the current block, and in order to derive a motion vector and/or a reference picture index of the current block, a flag or index information indicating which candidate is selected (used) may be signaled.

The inter prediction may be performed based on various prediction modes, and for example, in the case of a skip mode and a merge mode, the motion information of the current block may be the same as motion information of a selected neighboring block. In the case of the skip mode, unlike the merge mode, a residual signal may not be transmitted. In the case of a motion vector prediction (MVP) mode, the motion vector of the selected neighboring block may be used as a motion vector predictor, and a motion vector difference may be signaled. In this case, the motion vector of the current block may be derived by using the sum of the motion vector predictor and the motion vector difference.

FIGS. 8 and 9 are diagrams illustrating a video/image encoding method based on an inter prediction according to an embodiment of the present disclosure and an inter predictor in an encoding apparatus according to an embodiment of the present disclosure.

Referring to FIGS. 8 and 9, S801 may be performed by the inter predictor 180 of an encoding apparatus, and S802 may be performed by the residual processor of the encoding apparatus. Specifically, S802 may be performed by the subtractor 115 of the encoding apparatus. In S803, prediction information may be derived by the inter predictor 180 and encoded by the entropy encoder 190. In S803, residual information may be derived by the residual processor and may be encoded by the entropy encoder 190. The residual information is information on the residual samples. The residual information may include information on quantized transform coefficients for the residual samples.

As described above, the residual samples may be derived as transform coefficients through the transformer 120 of the encoding apparatus, and the transform coefficients may be derived as quantized transform coefficients through the quantizer 130. Information about the quantized transform coefficients may be encoded in the entropy encoder 190 through a residual coding procedure.

The encoding apparatus performs an inter prediction on a current block (S801). The encoding apparatus may derive an inter prediction mode and motion information of the current block, and generate prediction samples of the current block. Here, the procedure of determining the inter prediction mode, deriving the motion information, and generating the prediction samples may be performed simultaneously, or one procedure may be performed before another procedure. For example, the inter predictor 180 of the encoding apparatus may include a prediction mode determination unit 181, a motion information derivation unit 182, and a prediction sample derivation unit 183, the prediction mode determination unit 181 may determine a prediction mode for the current block, the motion information derivation unit 182 may derive the motion information of the current block, and the prediction sample derivation unit 183 may derive motion samples of the current block.

For example, the inter predictor 180 of the encoding apparatus may search for a block similar to the current block within a certain area (search area) of reference pictures through motion estimation, and derive a reference block in which the difference from the current block is a minimum or less than a predetermined reference. Based on this, a reference picture index indicating a reference picture in which the reference block is located may be derived, and a motion vector may be derived based on a location difference between the reference block and the current block. The encoding apparatus may determine a mode applied to the current block among various prediction modes. The encoding apparatus may compare RD costs for the various prediction modes and determine an optimal prediction mode for the current block.

For example, when the skip mode or merge mode is applied to the current block, the encoding apparatus may construct a merge candidate list to be described later, and derive a reference block in which the difference from the current block is a minimum or less than a predetermined reference among reference blocks indicated by merge candidates included in the merge candidate list. In this case, a merge candidate associated with the derived reference block is selected, and merge index information indicating the selected merge candidate may be generated and signaled to the decoding apparatus. The motion information of the current block may be derived using motion information of the selected merge candidate.

As another example, when an (A)MVP mode is applied to the current block, the encoding apparatus may construct an (A)MVP candidate list to be described later, and use a motion vector of a selected mvp candidate among mvp (motion vector predictor) candidates included in the (A)MVP candidate list as the mvp of the current block. In this case, for example, a motion vector indicating a reference block derived by the above-described motion estimation may be used as a motion vector of the current block, and among the mvp candidates, an mvp candidate having a motion vector having a smallest difference from the motion vector of the current block may be the selected mvp candidate. A motion vector difference (MVD) which is a difference obtained by subtracting the mvp from the motion vector of the current block may be derived. In this case, information on the MVD may be signaled to the decoding apparatus. In addition, when the (A)MVP mode is applied, the value of the reference picture index may be configured as reference picture index information and may be separately signaled to the decoding apparatus.

The encoding apparatus may derive residual samples based on the prediction samples (S802). The encoding apparatus may derive the residual samples by comparing the original samples of the current block with the prediction samples.

The encoding apparatus encodes image information including the prediction information and the residual information (S803). The encoding apparatus may output the encoded image information in a bitstream form. The prediction information is information related to the prediction procedure and may include prediction mode information (e.g. skip flag, merge flag or mode index, etc.) and information on motion information. The information on the motion information may include candidate selection information (e.g. merge index, mvp flag or mvp index) that is information for deriving the motion vector. In addition, the information on the motion information may include the information on the MVD and/or the reference picture index information described above.

In addition, the information on the motion information may include information indicating whether the L0 prediction, the L1 prediction, or the Bi prediction is applied. The residual information is information on the residual samples. The residual information may include information on quantized transform coefficients for the residual samples.

The output bitstream may be stored in a (digital) storage medium and transmitted to the decoding apparatus, or may be transmitted to the decoding apparatus through a network.

Meanwhile, as described above, the encoding apparatus may generate a reconstructed picture (including reconstructed samples and a reconstructed block) based on the reference samples and the residual samples. This is to derive a prediction result identical to that performed in the decoding apparatus in the encoding apparatus, and this is because coding efficiency can be improved. Accordingly, the encoding apparatus may store a reconstructed picture (or reconstructed samples, and a reconstructed block) in a memory and use it as a reference picture for the inter prediction. As described above, an in-loop filtering procedure or the like may be further applied to the reconstructed picture.

FIGS. 10 and 11 are diagrams illustrating a video/image decoding method based on an inter prediction according to an embodiment of the present disclosure and an inter predictor in a decoding apparatus according to an embodiment of the present disclosure.

Referring to FIGS. 10 and 11, a decoding apparatus may perform an operation corresponding to an operation performed in an encoding apparatus. The decoding apparatus may perform a prediction on a current block and derive prediction samples based on received prediction information.

S1001 to S1003 may be performed by the inter predictor 260 of the decoding apparatus, and residual information of S1004 may be obtained from a bitstream by the entropy decoder 210 of the decoding apparatus. A residual processing unit of the decoding apparatus may derive residual samples for the current block based on the residual information. Specifically, the dequantizer 220 of the residual processing unit may derive transform coefficients by performing inverse quantization based on the quantized transform coefficients derived based on the residual information, and the inverse transformer 230 of the residual processing unit may derive residual samples for the current block by performing an inverse transform on the transform coefficients. S1005 may be performed by the adder 235 or the reconstructor of the decoding apparatus.

Specifically, the decoding apparatus may determine a prediction mode for the current block based on received prediction information (S1001). The decoding apparatus may determine which inter prediction mode is applied to the current block based on prediction mode information in the prediction information.

For example, it may be determined whether the merge mode is applied to the current block or an (A)MVP mode is determined based on the merge flag. Alternatively, one of various inter prediction mode candidates may be selected based on the mode index. The inter prediction mode candidates may include the skip mode, merge mode, and/or (A)MVP mode, or may include various inter prediction modes to be described later.

The decoding apparatus derives motion information of the current block based on the determined inter prediction mode (S1002). For example, when the skip mode or merge mode is applied to the current block, the decoding apparatus may construct a merge candidate list to be described later, and select one merge candidate among merge candidates included in the merge candidate list. The selection may be performed based on the above-described selection information (merge index). The motion information of the current block may be derived using motion information of the selected merge candidate. The motion information of the selected merge candidate may be used as the motion information of the current block.

As another example, when the (A)MVP mode is applied to the current block, the decoding apparatus may construct an (A)MVP candidate list to be described later, and use a motion vector of a selected mvp candidate among mvp (motion vector predictor) candidates included in the (A)MVP candidate list as the mvp of the current block. The selection may be performed based on the above-described selection information (mvp flag or mvp index). In this case, the MVD of the current block may be derived based on information on the MVD, and a motion vector of the current block may be derived based on the mvp of the current block and the MVD. In addition, a reference picture index of the current block may be derived based on the reference picture index information. A picture indicated by the reference picture index in a reference picture list for the current block may be derived as a reference picture referenced for an inter prediction of the current block.

Meanwhile, as described later, motion information of the current block may be derived without configuring a candidate list, and in this case, motion information of the current block may be derived according to a procedure disclosed in a prediction mode to be described later. In this case, the configuration of the candidate list as described above may be omitted.

The decoding apparatus may generate prediction samples for the current block based on the motion information of the current block (S1003). In this case, the reference picture may be derived based on the reference picture index of the current block, and the prediction samples of the current block may be derived using samples of the reference block indicated by the motion vector of the current block on the reference picture. In this case, depending on the case as described later, a prediction sample filtering procedure may be further performed on all or part of the prediction samples of the current block.

For example, the inter predictor 260 of the decoding apparatus may include a prediction mode determination unit 261, a motion information derivation unit 262, and a prediction sample derivation unit 263, determine a prediction mode for the current block based on prediction mode information received from the prediction mode determination unit 261, derive motion information (motion vector and/or reference picture index, etc.) of the current block based on information on motion information received from the motion information derivation unit 262, and derive the prediction samples of the current block from the prediction sample derivation unit 263.

The decoding apparatus generates residual samples for the current block based on received residual information (S1004). The decoding apparatus may generate reconstructed samples for the current block based on the prediction samples and the residual samples, and generate a reconstructed picture based on this (S1005). Thereafter, as described above, an in-loop filtering procedure or the like may be further applied to the reconstructed picture.

As described above, the inter prediction procedure may include determining the inter prediction mode, deriving motion information according to the determined prediction mode, and performing the prediction (generating the prediction sample) based on the derived motion information.

Determination of Inter Prediction Mode

Various inter prediction modes may be used for a prediction of the current block in a picture. For example, various modes, such as a merge mode, a skip mode, an MVP mode, and an affine mode, may be used. A decoder side motion vector refinement (DMVR) mode, an adaptive motion vector resolution (AMVR) mode, or the like may be further used as an auxiliary mode. The affine mode may also be referred to as an affine motion prediction mode. The MVP mode may also be referred to as an advanced motion vector prediction (AMVP) mode.

Prediction mode information indicating the inter prediction mode of the current block may be signaled from the encoding apparatus to the decoding apparatus. The prediction mode information may be included in a bitstream and received in the decoding apparatus. The prediction mode information may include index information indicating one of a plurality of candidate modes. Alternatively, the inter prediction mode may be indicated through hierarchical signaling of flag information. In this case, the prediction mode information may include one or more flags.

For example, a skip flag may be signaled to indicate whether to apply the skip mode, when the skip mode is not applied, a merge flag may be signaled to indicate whether to apply the merge mode, when the merge mode is not applied, it may be indicated that the MVP mode is applied or a flag for additional classification may be further signaled. The affine mode may be signaled as an independent mode, or may be signaled as a mode dependent on the merge mode or the MVP mode. For example, the affine mode may be configured as one candidate of the merge candidate list or the MVP candidate list, as described later.

Derivation of Motion Information According to Inter Prediction Mode

The inter prediction may be performed using the motion information of the current block. The encoding apparatus may derive optimal motion information for the current block through a motion estimation procedure. For example, the encoding apparatus may search for a similar reference block with high correlation in a fractional pixel unit within a predetermined search range within a reference picture using an original block in an original picture for the current block, and derive motion information through this. The similarity of the block may be derived based on a difference between phase-based sample values. For example, the similarity of blocks may be calculated based on SAD between the current block (or template of the current block) and the reference block (or template of the reference block). In this case, the motion information may be derived based on a reference block having a smallest SAD in the search area. The derived motion information may be signaled to the decoding apparatus according to various methods based on the inter prediction mode.

Merge Mode and Skip Mode

FIG. 12 is a diagram illustrating a neighboring block used in a merge mode or a skip mode as an embodiment to which the present disclosure is applied.

When a merge mode is applied, motion information of a current prediction block is not directly transmitted, and the motion information of the current prediction block is derived using motion information of a neighboring prediction block. Accordingly, it is possible to indicate the motion information of the current prediction block by transmitting flag information indicating that the merge mode has been used and a merge index indicating which neighboring prediction block has been used.

An encoder may search for a merge candidate block used to derive the motion information of the current prediction block to perform the merge mode. For example, maximum five merge candidate blocks may be used, but the present disclosure is not limited thereto. In addition, the maximum number of the merge candidate blocks may be transmitted in a slice header (or a tile group header), and the present disclosure is not limited thereto. After finding the merge candidate blocks, the encoder may generate a merge candidate list and select the merge candidate block having a lowest cost among them as a final merge candidate block.

The present disclosure provides various embodiments of the merge candidate block constructing the merge candidate list.

The merge candidate list may use, for example, five merge candidate blocks. For example, four spatial merge candidates and one temporal merge candidate may be used. As a specific example, in the case of the spatial merge candidate, the blocks illustrated in FIG. 12 may be used as spatial merge candidates.

FIG. 13 is a flowchart illustrating a method of constructing a merge candidate list according to an embodiment to which the present disclosure is applied.

Referring to FIG. 13, a coding apparatus (encoder/decoder) inserts spatial merge candidates derived by searching for spatial neighboring blocks of a current block into a merge candidate list (S1301). For example, the spatial neighboring blocks may include a bottom left corner neighboring block, a left side neighboring block, a top right corner neighboring block, a top side neighboring block, and top left corner neighboring blocks of the current block.

However, as an example, in addition to the spatial neighboring blocks described above, additional neighboring blocks, such as a right neighboring block, a bottom neighboring block, and a bottom right neighboring block, may be further used as the spatial neighboring blocks. The coding apparatus may detect available blocks by searching for the spatial neighboring blocks based on priority, and derive motion information of the detected blocks as the spatial merge candidates. For example, the encoder and decoder may search the five blocks shown in FIG. 12 in the order of A1, B1, B0, A0, and B2, and sequentially index available candidates to construct the merge candidate list.

The coding apparatus inserts a temporal merge candidate derived by searching for a temporal neighboring block of the current block into the merge candidate list (S1302). The temporal neighboring block may be located on a reference picture that is a picture different from a current picture in which the current block is located. The reference picture in which the temporal neighboring block is located may be referred to as a collocated picture or a col picture. The temporal neighboring block may be searched in an order of a bottom right corner neighboring block and a bottom right center block of a co-located block for the current block on the col picture.

On the other hand, when motion data compression is applied, specific motion information may be stored as representative motion information for each predetermined storage unit in the col picture. In this case, it is not necessary to store motion information for all blocks in the predetermined storage unit, and motion data compression effect can be obtained through this. In this case, the predetermined storage unit may be predetermined, for example, in a 16×16 sample unit or an 8×8 sample unit, or size information on the predetermined storage unit may be signaled from the encoder to the decoder. When the motion data compression is applied, motion information of the temporal neighboring block may be replaced with representative motion information of the predetermined storage unit in which the temporal neighboring block is located.

That is, in this case, in terms of implementation, the temporal merge candidate may be derived based on, not a prediction block located at the coordinates of the temporal neighboring block, motion information of the prediction block covering the arithmetic left shifted location after arithmetic right shift by a predetermined value based on the coordinates of the temporal neighboring block (top left sample position). For example, when the predetermined storage unit is a 2n×2n sample unit, if the coordinates of the temporal neighboring block are (xTnb, yTnb), the motion information of the prediction block located at a modified location ((xTnb>>n)<<n), (yTnb>>n)<<n)) may be used for the temporal merge candidate.

Specifically, for example, when the predetermined storage unit is a 16×16 sample unit, if the coordinates of the temporal neighboring block are (xTnb, yTnb), the motion information of the prediction block located at a modified location ((xTnb>>4)<<4), (yTnb>>4)<<4)) may be used for the temporal merge candidate. Or, for example, when the predetermined storage unit is an 8×8 sample unit, if the coordinates of the temporal neighboring block are (xTnb, yTnb), the motion information of the prediction block located at a modified location ((xTnb>>3)<<3), (yTnb>>3)<<3)) may be used for the temporal merge candidate.

The coding apparatus may check whether the number of current merge candidates is less than the number of maximum merge candidates (S1303). The number of the maximum merge candidates may be pre-defined or may be signaled from the encoder to the decoder. For example, the encoder may generate and encode information on the number of the maximum merge candidates, and transmit the information to the decoder in a bitstream form. When the number of the maximum merge candidates is filled, a subsequent candidate addition process may not be performed.

As a result of the check, when the number of the current merge candidates is smaller than the number of the maximum merge candidates, the coding apparatus inserts an additional merge candidate into the merge candidate list (S1304). The additional merge candidate may include, for example, ATMVP, a combined bi-predictive merge candidate (when a slice type of a current slice is B type), and/or a zero vector merge candidate.

As a result of the check, when the number of the current merge candidates is not smaller than the number of the maximum merge candidates, the coding apparatus may terminate the construction of the merge candidate list. In this case, the encoder may select an optimal merge candidate among merge candidates constructing the merge candidate list based on a rate-distortion (RD) cost, and signal selection information (e.g. merge index) indicating the selected merge candidate to the decoder. The decoder may select the optimal merge candidate based on the merge candidate list and the selection information.

As described above, motion information of the selected merge candidate may be used as motion information of the current block, and prediction samples of the current block may be derived based on the motion information of the current block. The encoder may derive residual samples of the current block based on the prediction samples, and signal residual information on the residual samples to the decoder. As described above, the decoder may generate the residual samples derived based on the residual information and reconstructed samples based on the prediction samples, and generate a reconstructed picture based on this.

When the skip mode is applied, the motion information of the current block may be derived in the same manner as in the case where the merge mode is applied previously. However, when the skip mode is applied, a residual signal for a corresponding block is omitted, and thus the prediction samples may be directly used as the reconstructed samples.

MVP Mode

FIG. 14 is a flowchart illustrating a method of constructing a merge candidate list according to an embodiment to which the present disclosure is applied.

When a motion vector prediction (MVP) mode is applied, a motion vector predictor (mvp) candidate list may be generated using a motion vector of a reconstructed spatial neighboring block (for example, it may be the neighboring block described in FIG. 12) and/or a motion vector corresponding to the temporal neighboring block (or Col block). That is, the motion vector of the reconstructed spatial neighboring block and/or the motion vector corresponding to the temporal neighboring block may be used as a motion vector predictor candidate.

Information on the prediction may include selection information (e.g. MVP flag or MVP index) indicating a selected optimal motion vector predictor candidate among the motion vector predictor candidates included in the list. In this case, a predictor may select a motion vector predictor of the current block, among motion vector predictor candidates included in a motion vector candidate list, using the selection information. A predictor of the encoding apparatus may obtain a motion vector difference (MVD) between the motion vector and the motion vector predictor of the current block, encode this, and output it in a bitstream form. That is, the MVD may be obtained by subtracting the motion vector predictor from the motion vector of the current block. In this case, a predictor of the decoding apparatus may obtain a motion vector difference included in the information on the prediction, and derive the motion vector of the current block by adding the motion vector difference and the motion vector predictor. The predictor of the decoding apparatus may obtain or derive a reference picture index indicating a reference picture from the information on the prediction. For example, the motion vector predictor candidate list may be constructed as shown in FIG. 14.

ATMVP (Advanced Temporal Motion Vector Prediction)

FIGS. 15 and 16 are diagrams for explaining a method of deriving an Advanced Temporal Motion Vector Prediction (ATMVP) candidate as an embodiment to which the present disclosure is applied.

Referring to FIG. 15, ATMVP is a method of deriving motion information for subblocks of a coding unit based on motion information of collocated blocks of temporally neighboring pictures. Through this, the performance of a temporal motion vector prediction (TMVP) can be improved, and the complexity of the general or worst case can be reduced. In the present disclosure, the ATMVP may also be referred to as a subblock-based temporal merging candidate, SbTMVP.

In one embodiment of the present disclosure, the ATMVP may be derived by the following process.

First, the encoder/decoder may add a motion vector from spatial neighboring coding units if a neighboring coding unit is available, and a motion vector of the available coding unit is different from a motion vector in a current candidate list. As an example, referring to FIG. 16, the above-described process may be performed in the order of A1, B1, B0, A0, and B2. As another example, in order to improve complexity, the above-described process may derive the ATMVP using only a motion vector of a block at a fixed location (e.g. location A1).

The encoder/decoder may be used to determine a location where a first motion vector candidate among available No spatial candidates is to derive a collocated picture and motion information of each sub-block. Here, No represents the number of available spatial candidates. If No is 0, the collocated picture and a collocated position of motion 0 may be used to derive the motion information of each sub-block.

When a plurality of reference pictures are used, collocated pictures of different coding units in the ATMVP may not be the same. For different coding units in the current picture, having different collocated pictures for deriving the ATMVP means that motion information fields of the plurality of reference pictures must be derived, which is undesirable because it increases the memory bandwidth.

Accordingly, the present disclosure provides a more simplified design, which uses the same collocated picture when deriving the ATMVP. For example, a method of using the same collocated picture may be defined in a slice (or a tile group) header, but the present disclosure is not limited thereto. For example, at the block level, if the reference picture of the neighboring block A is different from the collocated picture, the motion vector of the neighboring block A may be scaled based on a temporal motion vector scaling method. In addition, the scaled motion vector of the neighboring block A may be used in the ATMVP.

FIG. 17 is a diagram illustrating a method of deriving an Advanced Temporal Motion Vector Prediction (ATMVP) candidate as an embodiment to which the present disclosure is applied.

Referring to FIG. 17, in one embodiment of the present disclosure, since TMVP using the motion vector of the right-bottom block of the current block or the temporal neighboring block (or colPB) at the center location of the current block does not reflect the motion in the screen, the encoder/decoder may use the motion vector of colPB at the location indicated by the motion vector of the neighboring block as MVP.

For example, the encoder/decoder may find a motion vector of an available spatial neighboring block first while checking in the same manner as in the merge candidate construction sequence shown in FIG. 17. In addition, a location indicated by the motion vector in the reference picture may be derived as col-PB (i.e. the ATMVP candidate).

In addition, the motion vector may be used as a motion vector of a corresponding block in each sub-block unit. At this time, if there is no motion vector in a specific sub-block, the motion vector of the center block located at the center of the corresponding block may be used as a motion vector for an unavailable sub-block, and this may be stored as a representative motion vector.

Temporal Motion Vector Data Storage Reduction

In one embodiment of the present disclosure, for compressing temporal motion vector data, a method of reducing temporal motion vector storage based on motion vector data of spatial candidates is proposed.

FIGS. 18 and 19 are diagrams illustrating a method of compressing temporal motion vector data and locations of spatial candidates used therein according to an embodiment to which the present disclosure is applied.

Referring to FIG. 18, in one embodiment of the present disclosure, when a spatial candidate is predicted by an inter prediction, a motion vector of the spatial candidate may be set as a default motion vector for compression. For example, maximum five spatial candidates may be used as reference temporal motion information for deriving a basic temporal motion vector. In one embodiment, the five spatial candidates may be set as shown in FIG. 19.

Further, temporal motion vector data may be compressed based on motion vectors of spatial candidates. The order of searching for the spatial candidates may be as illustrated in FIG. 18. The spatial candidates may be checked according to the order of a center block C, a top left block TL, an top right block TR, a bottom left block BL, and a bottom right block BR. This is only one embodiment, and the present disclosure is not limited thereto, and other combinable sequences may be applied.

First, the encoder/decoder may check whether the center block C is inter-predicted. If the center block C is inter-predicted, the encoder/decoder may set a motion vector of the center block C as a default for a motion vector prediction.

If the center block C is not inter-predicted, the encoder/decoder may check whether the top left block TL is inter-predicted. If the top left block TL is inter-predicted, the encoder/decoder may set a motion vector of the top left block TL as the default for the motion vector prediction.

If the top left block TL is not inter-predicted, the encoder/decoder may check whether the top right block TR is inter-predicted. If the top right block TR is inter-predicted, the encoder/decoder may set a motion vector of the top right block TR as the default for the motion vector prediction.

If the top right block TR is not inter-predicted, the encoder/decoder may check whether the bottom left block BL is inter-predicted. If the bottom left block BL is inter-predicted, the encoder/decoder may set a motion vector of the bottom left block BL as the default for the motion vector prediction.

If the bottom left block BL is not inter-predicted, the encoder/decoder may check whether the bottom right block BR is inter-predicted. If the bottom right block BR is inter-predicted, the encoder/decoder may set a motion vector of the bottom right block BR as the default for the motion vector prediction.

If the bottom right block BR is not inter-predicted, the encoder/decoder may set an intra mode as a default.

Through the above process, the encoder/decoder may compress a default motion vector into motion information.

Embodiment of Performing ATMVP Based on Adaptive Sub-Block Size

In one embodiment of the present disclosure, a method of performing ATMVP based on an adaptive sub-block size is proposed. For example, the sub-block size used for deriving the ATMVP may be adaptively applied at a slice level.

On the other hand, if ATMVP motion information is derived in a 4×4 block unit, there may be a problem that motion derivation and motion compensation are performed in every 4×4 sub-block unit within one ATMVP coding unit.

To solve this, the encoder may signal one default sub-block size used for deriving an ATMVP motion to the decoder at a sequence level.

As another example, when a default sub-block size is used in the current slice, a flag may be signaled at a picture or slice level. When the flag is false, an ATMVP sub-block size may be additionally signaled in the slice header.

Embodiment of Restricting an Area for Deriving Collocated Block

In the present disclosure, an area of a collocated block for ATMVP may include an N×N block of one column in a current CTU and collocated picture. For example, the N×N block may be a 4×4 block, but the present disclosure is not limited thereto.

If an ATMVP collocated block identified by the motion vector of the merge candidate is located outside the restricted area, it may be moved to be located within the restricted area. For example, it may be moved to be located at the nearest boundary within the restricted area.

Embodiment of Deriving Subblock-Based Temporal Merging Candidate

In one embodiment of the present disclosure, the encoder/decoder may add motion information of a collocated block (or collocated subblock) in a collocated picture specified based on motion information of spatially neighboring blocks to a subblock merging candidate list as a subblock-based temporal merging candidate.

In the present disclosure, the motion information of spatially neighboring blocks may be referred to as a temporal motion vector. As an embodiment, when the width and height of the current coding block are greater than or equal to a predetermined specific size, the encoder/decoder may derive the subblock-based temporal merging candidate. For example, the predetermined specific size may be 8.

As an embodiment, the encoder/decoder may set motion information of a first spatial candidate among the available spatial candidates as the temporal motion vector. For example, the encoder/decoder may search for available spatial candidates in the order of A1, B1, B0, and A0. In this case, the encoder/decoder may set a spatial candidate having the same reference picture as the collocated picture among the available spatial candidates as the temporal motion vector. As another example, the encoder/decoder may check whether a spatial candidate of one fixed location is available, and if available, may set a motion vector of the corresponding spatial candidate as the temporal motion vector. For example, the spatial candidate of the one fixed location may be set as a block of the location A1.

In addition, the encoder/decoder may specify the location of the collocated block in the collocated picture by using the temporal motion vector. As an example, the following Equation 1 may be used.

$$xColCb=Clip3(xCtb,Min(CurPicWidthInSamplesY-1,xCtb+(1<<Ctb\ Log\ 2SizeY)+3),xColCtrCb+(tempMv[0]>>4))$$

$$yColCb=Clip3(yCtb,Min(CurPicHeightInSamplesY-1,yCtb+(1<<Ctb\ Log\ 2SizeY)-1),yColCtrCb+(tempMv[1]>>4))$$ [Equation 1]

Here, (xColCtrCb, yColCtrCb) denotes a location of the top-left sample of the collocated coding block including the bottom right sample at the center location, and tempMv denotes the temporal motion vector.

In addition, the encoder/decoder may determine a location to derive motion information of each sub-block in the current coding block in a sub-block unit. In one embodiment, a location of a collocated subblock in the collocated picture may be derived using Equation 2 below.

$$xColSb=Clip3(xCtb,Min(CurPicWidthInSamplesY-1,xCtb+(1<<Ctb\ Log\ 2SizeY)+3),xSb+(tempMv[0]>>4))$$

$$yColSb=Clip3(yCtb,Min(CurPicHeightInSamplesY-1,yCtb+(1<<Ctb\ Log\ 2SizeY)-1),ySb+(tempMv[1]>>4))$$ [Equation 2]

Here, (xSb, ySb) denotes a location of the current sub-block.

In one embodiment, the encoder/decoder may use motion information of the collocated block specified using a temporal motion vector when the collocated subblock is not currently available.

In general, the temporal motion vector by the Advanced Temporal Motion Vector Prediction (ATMVP) is derived by using all reference pictures configured in a reference picture list without limitation. That is, the number of reference pictures may increase in order to derive the temporal motion vector, thereby causing an increase in memory bandwidth for temporal motion data.

Accordingly, an object of the present disclosure is to propose a method of deriving a temporal motion vector from one reference picture in order to solve this problem.

In addition, an object of the present disclosure is to propose a method of selecting one reference picture for deriving a temporal motion vector by a signaled syntax.

In addition, an object of the present disclosure is to propose a method of selecting one reference picture for deriving a temporal motion vector based on a picture order count.

In addition, an object of the present disclosure is to propose a method of selecting a spatial candidate for deriving the Advanced Temporal Motion Vector Prediction (ATMVP).

In addition, an object of the present disclosure is to propose a method of deriving a temporal motion vector based on backward mapping from one reference picture.

Embodiment 1

In one embodiment of the present disclosure, the encoder/decoder may derive a temporal motion vector using one reference picture to improve memory bandwidth.

The temporal motion data may be derived from all reference pictures already decoded in the encoder as well as the decoder. However, a method of deriving the temporal motion vector from all reference pictures without limitation causes a problem of increasing a memory bandwidth and a memory usage problem at hardware using a temporal memory structure to store motion data of the reference picture.

Therefore, in order to solve this problem, the method proposed in the present embodiment can derive the temporal motion vector from a pre-defined reference picture. It will be described with reference to the following drawings.

FIG. 20 is a diagram illustrating a method of deriving a temporal motion vector using a fixed reference picture according to an embodiment to which the present disclosure is applied.

Referring to FIG. 20, it is assumed that one pre-defined reference picture exists in a reference picture list 0 direction.

The encoder/decoder may fix a reference picture for deriving a temporal candidate of a current block as a pre-defined reference picture. As shown in FIG. 20, although there are other reference pictures for deriving a temporal motion vector, only a reference picture pre-defined by a specific method may be referred to derive temporal motion data.

In one embodiment, the pre-defined reference picture may be set as a collocated picture. In the present disclosure, the collocated picture may be referred to as a col picture. The pre-defined reference picture may be determined by various methods. It will be described below.

As an embodiment, when the ATMVP mode is applied to the current block, the encoder/decoder may specify a block in the pre-defined reference picture using a motion vector of a spatial candidate, and derive a motion vector of the current block in a sub-block unit from the specified block.

In one embodiment, the above-described FIG. 20 is a method of deriving a temporal representative motion vector, and the temporal representative motion vector may be selected as a temporal motion vector of a block corresponding to a center location of the current block.

In addition, in one embodiment, if a block corresponding to the current block in the collocated picture (or collocated block) is not encoded by an inter prediction, that is, if it is encoded by an intra-picture block copy or an intra-picture prediction, or if there is no temporal motion vector in the corresponding block, the encoder/decoder may derive a temporal motion vector of a sub-block in the current block using the temporal representative motion vector. In the present disclosure, the temporal representative motion vector may be referred to as a motion vector of a center location sub-block, a default motion vector, or a default sub-block motion vector, etc. In one embodiment of the present disclosure, in the process of deriving an ATMVP temporal motion vector in the sub-block unit based on a location of a temporal candidate block determined from the spatial candidate, if a block corresponding to a current sub-block does not have a temporal motion vector, a motion vector of the current sub-block may be derived based on the temporal representative motion vector (or the motion vector of the center location sub-block, the default motion vector, and the default sub-block motion vector).

Embodiment 2

In one embodiment of the present disclosure, one reference picture for deriving a temporal motion vector may be selected by a signaled syntax. That is, the syntax indicating the reference picture for deriving the temporal motion vector may be signaled from the encoder to select one specific reference picture among the reference pictures included in a reference picture list. Table 2 below shows an example of a proposed syntax.

TABLE 2

| | Desriptor |
|---|---|
| if(temporal_motion_verctor_prediction_enable) | |
|     ref_idx_for_termporal_motion_vector_prediction | u(1) |

In Table 2, the ref_idx_for_termporal_motion_vector_prediction syntax (syntax element) represents the reference picture for deriving the temporal motion vector. The reference picture for deriving the temporal motion vector in the reference picture list may be specified by the ref_idx_for_termporal_motion_vector_prediction syntax, and the encoder/decoder may derive a motion vector of a sub-block from the specified reference picture.

The syntax elements of Table 2 may be transmitted through a sequence parameter set, a picture parameter set, or a slice header (or a tile group header).

As described above, in one embodiment, one fixed reference picture may be the collocated picture. Table 3 below shows another example of a proposed syntax.

TABLE 3

| | Desriptor |
|---|---|
| if(slice_temporal_mvp_enabled_flag) | |
|   if(slice_type = = B) | |
|     collocated_from_l0_flag | u(1) |
|   if((collocated_form_l0_flag && | |
|   num_ref_idx_L0_active_minus1>0) // | |
|   (!collocated_form_l0 flag && | |
|   num_ref_idx_L1_active_minus1>0)) | |
|     collocated_ref_idx | u(1) |

Referring to Table 3, the collocated_from_l0_flag syntax (or syntax element) is a syntax indicating a reference picture list direction of the collocated picture for a temporal motion vector prediction, and the collocated_ref_idx syntax is a syntax indicating a collocated picture index.

The syntax elements of Table 3 may be transmitted through a sequence parameter set, a picture parameter set, or a slice header (or a tile group header).

In one embodiment, in the process of deriving an ATMVP temporal motion vector in the sub-block unit based on a location of a temporal candidate block determined from the spatial candidate, if a block corresponding to a current sub-block does not have a temporal motion vector, a motion vector of the current sub-block may be derived based on the temporal representative motion vector (or the motion vector of the center location sub-block, the default motion vector, and the default sub-block motion vector).

In addition, in one embodiment, if a block corresponding to the current block in the collocated picture (or collocated block) is not encoded by an inter prediction, that is, if it is encoded by an intra-picture block copy or an intra-picture prediction, or if there is no temporal motion vector in the corresponding block, the encoder/decoder may derive a temporal motion vector of a sub-block in the current block using the temporal representative motion vector. In the present disclosure, the temporal representative motion vector may be referred to as a motion vector of a center location sub-block, a default motion vector, or a default sub-block motion vector, etc.

Embodiment 3

In one embodiment of the present disclosure, a reference picture for deriving a temporal motion vector may be defined in an encoder and a decoder based on a picture order count (POC).

FIG. 21 is a diagram illustrating a method of deriving a fixed reference picture for a temporal motion vector prediction as an embodiment to which the present disclosure is applied.

Referring to FIG. 21, in one embodiment, the fixed reference picture may be defined as a reference picture closest to a current picture in a reference picture list. In FIG. 21, it is assumed that the POC of the current picture is 6, the POCs of three reference pictures of the reference picture list 0 are 2, 3, and 4, respectively, and the POC of one reference picture of the reference picture list 1 is 10.

In this case, the fixed reference picture for the temporal motion vector prediction may be set as a reference picture having POC 4. That is, the closest picture in the reference picture list may have the smallest POC difference from the current picture.

FIG. 22 is a diagram illustrating a method of deriving a fixed reference picture for a temporal motion vector prediction as an embodiment to which the present disclosure is applied.

Referring to FIG. 22, it is assumed that the POC of the current picture is 6, the POCs of three reference pictures of the reference picture list 0 are 2, 3, and 4, respectively, and the POC of one reference picture of the reference picture list 1 is 8. In addition, it is assumed that a reference picture of POC 4 has a temporal ID of 3, and a reference picture of POC 8 has a temporal ID of 0.

In one embodiment, when reference pictures having the same POC distance with the smallest POC difference exist in the reference picture list, the encoder/decoder may select a reference picture having the smallest POC difference and the smallest temporal ID as a reference picture for a temporal motion vector prediction. That is, a reference picture of POC 8 of the reference picture list 1 may be set as the reference picture for the temporal motion vector prediction.

In one embodiment, the above-described FIGS. 21 and 22 are a method of deriving a temporal representative motion vector, and the temporal representative motion vector may be selected as a time motion vector of a block corresponding to a center location of a current block.

In one embodiment, in the process of deriving an ATMVP temporal motion vector in the sub-block unit based on a location of a temporal candidate block determined from the spatial candidate, if a block corresponding to a current sub-block does not have a temporal motion vector, a motion vector of the current sub-block may be derived based on the temporal representative motion vector (or the motion vector of the center location sub-block, the default motion vector, and the default sub-block motion vector).

In addition, in one embodiment, if a block corresponding to the current block in the collocated picture (or collocated block) is not encoded by an inter prediction, that is, if it is encoded by an intra-picture block copy or an intra-picture prediction, or if there is no temporal motion vector in the corresponding block, the encoder/decoder may derive a temporal motion vector of a sub-block in the current block using the temporal representative motion vector. In the present disclosure, the temporal representative motion vector may be referred to as a motion vector of a center location sub-block, a default motion vector, or a default sub-block motion vector, etc.

Embodiment 4

In one embodiment of the present disclosure, a method of selecting a spatial candidate for deriving ATMVP is proposed. As described above, the ATMVP is a technique that uses temporal motion data from a reference picture. The ATMVP derives the temporal motion data from a temporal candidate block, in which a location of the temporal candidate block is determined by a motion vector of a spatial neighboring candidate.

The conventional ATMVP method can theoretically refer to all reference pictures in the reference picture list. That is, the reference picture for deriving a temporal motion vector may be defined based on motion information of a selected candidate among spatial candidates. In the worst case, since all spatial candidates refer to different reference pictures, a situation may arise in which many reference pictures are used for deriving the ATMVP.

Accordingly, in one embodiment of the present disclosure, the encoder/decoder may select one pre-defined reference picture as a spatial candidate used for deriving the ATMVP.

FIGS. 23 and 24 are diagrams illustrating a method of selecting a spatial candidate used to derive an ATMVP candidate and a method of performing motion compensation in a sub-block unit using a selected spatial candidate as an embodiment to which the present disclosure is applied.

Referring to FIG. 23, in one embodiment, a search order of spatial candidates may be set to A, B, C, D, and E blocks. The encoder/decoder may select a first valid spatial candidate in a spatial candidate list as a spatial candidate for deriving ATMVP. In this case, a spatial candidate around a current block may indicate (or refer to) one or more reference pictures as shown in FIG. 23. In FIG. 23, it is assumed that a pre-defined reference picture is defined as a reference picture having a reference picture index of 0.

The encoder/decoder may select a spatial candidate B having an earliest search order as the spatial candidate for deriving the ATMVP among spatial candidates that refer to the same reference picture as the pre-defined reference picture.

Referring to FIG. 24, the encoder/decoder may identify a corresponding block (or reference block) of the current block in the pre-defined reference picture by using motion information of the selected spatial candidate B. In addition, the encoder/decoder may derive a motion vector in the sub-block unit of the current block by using a motion vector of the corresponding block.

In addition, there may be a case where there is no spatial candidate, among the spatial candidates, that refers to the same reference picture as the pre-defined reference picture. In this case, the encoder/decoder may determine a motion vector for deriving the ATMVP in the following method.

As a first method, the encoder/decoder may use a zero motion vector. That is, the encoder/decoder may specify a block at the same location as the current block in the pre-defined reference picture using the zero motion vector, and derive a motion vector from the specified block in the sub-block unit.

As a second method, the encoder/decoder may not use the ATMVP candidate when there is no spatial candidate referring to the same reference picture as the pre-defined reference picture.

As a third method, the encoder/decoder may scale a motion vector of a first valid spatial candidate to the pre-defined picture. It will be described with reference to the following drawings.

FIG. 25 is a diagram illustrating a method of deriving a temporal motion vector according to an embodiment to which the present disclosure is applied.

Referring to FIG. 25, it is assumed that a motion vector of a valid spatial candidate A is expressed as MVx and MVy. In one embodiment of the present disclosure, the motion vector of the valid spatial candidate A that does not refer to a pre-defined reference picture may be scaled to the pre-defined reference picture. In FIG. 25, the scaled motion vector may be expressed as scaled MVx and scaled MVy.

In one embodiment, the encoder/decoder may scale the motion vector of the candidate to the pre-defined reference picture based on a picture order count (POC).

In addition, in one embodiment, the pre-defined reference picture may be set as a collocated picture. In this case, the motion vector of the spatial candidate may be scaled to the collocated picture.

In the present disclosure, it is assumed that a plurality of spatial neighboring blocks are searched to derive an ATMVP candidate, but the present disclosure is not limited thereto. For example, the encoder/decoder may use a motion vector of a spatial neighboring block at a fixed location (e.g. location block A in FIG. 25) to derive the ATMVP candidate.

In one embodiment, FIGS. 23 to 25 described above are methods of deriving a temporal representative motion vector, and the temporal representative motion vector may be selected as a temporal motion vector of a block corresponding to a center location of a current block.

In one embodiment, in the process of deriving an ATMVP temporal motion vector in a sub-block unit based on a location of a temporal candidate block determined from the spatial candidate, if a block corresponding to a current sub-block does not have the temporal motion vector, a motion vector of the current sub-block may be derived based on the temporal representative motion vector. In the present disclosure, the temporal representative motion vector may be referred to as a motion vector of a center location sub-block, a default motion vector, or a default sub-block motion vector, etc.

In addition, in one embodiment, if a block corresponding to the current block in the collocated picture (or collocated block) is not encoded by an inter prediction, that is, if it is encoded by an intra-picture block copy or an intra-picture prediction, or if there is no temporal motion vector in the corresponding block, the encoder/decoder may derive a temporal motion vector of a sub-block in the current block using the temporal representative motion vector. In the present disclosure, the temporal representative motion vector may be referred to as a motion vector of a center location sub-block, a default motion vector, or a default sub-block motion vector, etc.

Embodiment 5

In one embodiment of the present invention, a method of deriving a temporal motion vector based on backward mapping from one reference picture may be applied.

FIGS. 26 and 27 are diagrams illustrating a method of deriving a temporal motion vector using backward mapping according to an embodiment of the present disclosure.

Referring to FIG. 26, the encoder/decoder may use motion data in a plurality of reference pictures through backward mapping as shown in FIG. 26, and may derive a temporal motion vector based on this. In this case, as an embodiment, a candidate on which the backward mapping is performed may be a unilateral candidate or a bilateral candidate.

In one embodiment, in order to improve memory bandwidth, a reference picture used for the backward mapping may be pre-defined. Also, a candidate used for the backward mapping may be limited to the unilateral candidate.

Referring to FIG. 27, the backward mapping procedure may be applied to a pre-defined picture including only the unilateral candidate.

In one embodiment, the above-described FIGS. 26 and 27 are a method of deriving a temporal representative motion vector, and the temporal representative motion vector may be selected as a temporal motion vector of a block corresponding to a center location of the current block.

In one embodiment, in the process of deriving an ATMVP temporal motion vector in the sub-block unit based on a location of a temporal candidate block determined from the spatial candidate, if a block corresponding to a current sub-block does not have a temporal motion vector, a motion vector of the current sub-block may be derived based on the temporal representative motion vector (or the motion vector of the center location sub-block, the default motion vector, and the default sub-block motion vector).

In addition, in one embodiment, if a block corresponding to the current block in the collocated picture (or collocated block) is not encoded by an inter prediction, that is, if it is encoded by an intra-picture block copy or an intra-picture prediction, or if there is no temporal motion vector in the corresponding block, the encoder/decoder may derive a temporal motion vector of a sub-block in the current block using the temporal representative motion vector. In the present disclosure, the temporal representative motion vector may be referred to as a motion vector of a center location sub-block, a default motion vector, or a default sub-block motion vector, etc.

The embodiments of the present disclosure described above have been separately described for convenience of description, but the present disclosure is not limited thereto. That is, the embodiments described in Embodiments 1 to 3 described above may be performed independently, or may be performed by combining one or more embodiments.

FIG. 28 is a flowchart illustrating a method of generating an inter prediction block according to an embodiment to which the present disclosure is applied.

Referring to FIG. 28, a decoder is mainly described for convenience of explanation, but the present disclosure is not limited thereto, and the method for generating an inter prediction block according to an embodiment of the present disclosure may be performed in the same manner in an encoder and the decoder.

The decoder derives a motion vector of an available spatial neighboring block around a current block (S2801). As an embodiment, when a subblock based temporal motion vector prediction is applied to the current block, the decoder may derive the motion vector of the available spatial neighboring block of the current block.

The decoder derives a collocated block of the current block based on the motion vector of the spatial neighboring block (S2802).

The decoder derives a motion vector in a sub-block unit in the current block based on a motion vector of the collocated block (S2803).

The decoder generates a prediction block of the current block using the motion vector derived in the sub-block unit (S2804).

As an embodiment, the collocated block may be specified in one pre-defined reference picture by the motion vector of the spatial neighboring block.

As described above, the decoder may scale the motion vector of the spatial neighboring block based on a picture order count (POC).

In addition, as described above, the decoder may scale the motion vector of the spatial neighboring block based on a picture order count (POC) difference between a first reference picture of the spatial neighboring block and a second reference picture of a block specified by the motion vector of the spatial neighboring block, and a POC difference between a current picture and the one pre-defined reference picture, and may derive the collocated block in the one pre-defined reference picture using the scaled motion vector.

In addition, as described above, the one pre-defined reference picture may be signaled from an encoder through a sequence parameter set, a picture parameter set, or a tile group header.

In addition, as described above, the one pre-defined reference picture may be defined as a reference picture closest to a current picture based on the POC in a reference picture list of the current block.

In addition, as described above, the one pre-defined reference picture may be defined as a reference picture having a smallest temporal ID among the reference pictures when there are a plurality of reference pictures closest to the current picture based on the POC in the reference picture list of the current block.

FIG. 29 is a diagram illustrating an inter prediction device according to an embodiment to which the present disclosure is applied.

In FIG. 29, for convenience of description, an inter predictor is illustrated as one block, but the inter predictor may be implemented in a configuration included in an encoder and/or a decoder.

Referring to FIG. 29, the inter predictor implements the functions, processes and/or methods proposed in FIGS. 8 to 28 above. Specifically, the inter predictor may be configured to include a spatial candidate derivation unit 2901, a collocated block derivation unit 2902, a sub-block motion vector derivation unit 2903, and a prediction block generator 2904.

The spatial candidate derivation unit 2901 derives a motion vector of an available spatial neighboring block around a current block. As an embodiment, when a subblock based temporal motion vector prediction is applied to the current block, the spatial candidate derivation unit 2901 may derive the motion vector of the available spatial neighboring block of the current block.

The collocated block derivation unit 2902 derives a collocated block of the current block based on the motion vector of the spatial neighboring block.

The sub-block motion vector derivation unit 2903 derives a motion vector in a sub-block unit in the current block based on a motion vector of the collocated block.

The prediction block generator 2904 generates a prediction block of the current block using the motion vector derived in the sub-block unit.

As an embodiment, the collocated block may be specified by the motion vector of the spatial neighboring block in one pre-defined reference picture.

As described above, the collocated block derivation unit 2902 may scale the motion vector of the spatial neighboring block based on a picture order count (POC).

In addition, as described above, the collocated block derivation unit 2902 may scale the motion vector of the spatial neighboring block based on a picture order count (POC) difference between a first reference picture of the spatial neighboring block and a second reference picture of a block specified by the motion vector of the spatial neighboring block, and a POC difference between a current picture and the one pre-defined reference picture, and may derive the collocated block in the one pre-defined reference picture using the scaled motion vector.

In addition, as described above, the one pre-defined reference picture may be signaled from an encoder through a sequence parameter set, a picture parameter set, or a tile group header.

In addition, as described above, the one pre-defined reference picture may be defined as a reference picture closest to the current picture based on the POC in a reference picture list of the current block.

In addition, as described above, the one pre-defined reference picture may be defined as a reference picture having a smallest temporal ID among the reference pictures when there are a plurality of reference pictures closest to the current picture based on the POC in the reference picture list of the current block.

FIG. 30 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 31 is a configuration diagram of a content streaming system as an embodiment to which the present disclosure is applied.

The content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of decoding an image based on an inter prediction mode, the method comprising:
   based on that a reference picture of a spatial neighboring block around a current block is the same as one pre-determined reference picture among reference pictures included in a reference picture list: deriving, by a processor, a collocated block of the current block, wherein the collocated block is in the one pre-determined reference picture, and wherein the collocated block is specified by a motion vector of the spatial neighboring block referring to the one pre-determined reference picture;

deriving, by the processor, a motion vector in a sub-block unit in the current block based on the motion vector of the collocated block; and generating, by the processor, a prediction block of the current block based on the motion vector derived in the sub-block unit, wherein the one pre-determined reference picture is signaled from an encoder through a picture header or a slice header.

2. The method of claim 1, further comprising:

deriving, by the processor, motion vectors of available spatial neighboring blocks among spatial neighboring blocks around the current block in a pre-determined order.

3. The method of claim 2, wherein the pre-determined order is a block neighboring a left side of the current block, a block neighboring upper side of the current block, a block neighboring a upper side of the current block, a block neighboring a upper-right corner of the current block, a block neighboring a lower-left corner of the current block, and a block neighboring a upper-left corner of the current block.

4. The method of claim 1, wherein the spatial neighboring block the motion vector of which specifies the collocated block is located at a bottom of a left side of the current block.

5. A method of encoding an image based on an inter prediction mode, comprising:

based on that a reference picture of a spatial neighboring block around a current block is the same as one pre-determined reference picture among reference pictures included in a reference picture list: deriving, by a processor, a collocated block of the current block, wherein the collocated block is in the one pre-determined reference picture, and wherein the collocated block is specified by a motion vector of the spatial neighboring block referring to the one pre-determined reference picture;

deriving, by the processor, a motion vector in a sub-block unit in the current block based on a motion vector of the collocated block;

generating, by the processor, a prediction block of the current block based on the motion vector derived in the sub-block unit; and signaling, by the processor, the one pre-determined reference picture through a picture header or a slice header.

6. The method of claim 5, further comprising:

deriving, by the processor, motion vectors of available spatial neighboring blocks among spatial neighboring blocks around the current block in a pre-determined order.

7. The method of claim 6, wherein the pre-determined order is a block neighboring a left side of the current block, a block neighboring upper side of the current block, a block neighboring a upper side of the current block, a block neighboring a upper-right corner of the current block, a block neighboring a lower-left corner of the current block, and a block neighboring a upper-left corner of the current block.

8. The method of claim 5, wherein the spatial neighboring block the motion vector of which specifies the collocated block is located at a bottom of a left side of the current block.

9. A non-transitory decoder-readable medium for storing a bitstream generated by a video encoder, the bitstream comprising:

information used for deriving a collocated block of a current block based on that a reference picture of a spatial neighboring block around the current block is the same as one pre-determined reference picture among reference pictures included in a reference picture list, the collocated block located in the one pre-determined reference picture, and the collocated block specified by a motion vector of the spatial neighboring block referring to the one pre-determined reference picture;

information used for deriving a motion vector in a sub-block unit in the current block based on a motion vector of the collocated block;

information used for generating a prediction block of the current block based on the motion vector derived in the sub-block unit; and information about the one pre-determined reference picture included in a picture header or a slice header.

* * * * *